US006295422B1

(12) United States Patent
Curry et al.

(10) Patent No.: US 6,295,422 B1
(45) Date of Patent: Sep. 25, 2001

(54) ENCODED WHEEL FOR A TONER CARTRIDGE

(75) Inventors: Steven Alan Curry, Nicholasville; Benjamin Keith Newman, Lexington; Earl Dawson Ward, II, Richmond; Phillip Byron Wright, Lexington, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/557,096

(22) Filed: Apr. 21, 2000

Related U.S. Application Data

(62) Division of application No. 09/415,620, filed on Oct. 12, 1999, which is a continuation of application No. 08/975,389, filed on Nov. 20, 1997, now Pat. No. 6,009,285, which is a continuation of application No. 08/768,257, filed on Dec. 17, 1996, now Pat. No. 5,995,772, which is a continuation-in-part of application No. 08/602,648, filed on Feb. 16, 1996, now Pat. No. 5,634,169.

(51) Int. Cl.[7] ............................ G03G 15/08; B32B 31/00
(52) U.S. Cl. ...................... 399/12; 156/108; 156/DIG. 5; 235/461; 399/27
(58) Field of Search ................................ 399/12, 13, 24, 399/25, 27; 156/108, DIG. 5

(56) References Cited

U.S. PATENT DOCUMENTS

| | | | |
|---|---|---|---|
| 3,047,675 | 7/1962 | Berryhill | 179/100.3 |
| 3,104,110 | 9/1963 | Cohn et al. | 274/1 |
| 3,700,323 | 10/1972 | Guyette et al. | 355/3 |
| 3,732,003 | 5/1973 | Altmann et al. | 355/3 |
| 3,912,926 | 10/1975 | Coulbourn | 250/231.16 |
| 4,003,258 | 1/1977 | Suzuki | 73/290 R |
| 4,072,415 | 2/1978 | Inoue et al. | 355/14 |
| 4,074,798 | 2/1978 | Berger | 197/53 |
| 4,592,642 | 6/1986 | Imaizumi et al. | 355/3 DD |
| 4,668,074 | 5/1987 | Hirozane | 355/14 D |
| 4,711,561 | 12/1987 | Tsuruoka | 355/3 R |
| 4,743,936 | 5/1988 | Bares | 355/3 DD |
| 4,849,680 | 7/1989 | Miyamoto | 318/602 |
| 4,912,512 | 3/1990 | Midorikawa et al. | 355/260 |
| 4,959,037 | 9/1990 | Garfinkel | 446/299 |
| 4,982,230 | 1/1991 | Ogura et al. | 399/35 |
| 4,989,754 | 2/1991 | Grasso et al. | 222/39 |
| 5,036,363 | 7/1991 | Lida et al. | 355/246 |

(List continued on next page.)

FOREIGN PATENT DOCUMENTS

| | | | |
|---|---|---|---|
| 0 790536 A2 | 8/1997 | (EP) | G03G/15/08 |
| 57-158862 A | 9/1982 | (JP) | G03G/15/08 |
| 58-009170 A | 1/1983 | (JP) | G03G/15/08 |
| 60-178474 A | 9/1985 | (JP) | G03G/15/08 |
| 62-86382 | 4/1987 | (JP) | G03G/15/08 |
| 63-43466 | 2/1988 | (JP) . | |
| 01-205176 A | 8/1989 | (JP) | G03G/15/00 |
| 01205176 | 8/1989 | (JP) | G03G/15/00 |
| 3-82916 * | 4/1991 | (JP) . | |
| 05040371 | 2/1993 | (JP) | G03G/15/00 |
| 05-063911 A | 3/1993 | (JP) | H04N/1/04 |
| 5-323788 | 12/1993 | (JP) . | |
| 07-306612 A | 11/1995 | (JP) | G03G/21/00 |
| 07306612 | 11/1995 | (JP) | G03G/21/00 |

*Primary Examiner*—Quana M. Grainger
(74) *Attorney, Agent, or Firm*—John A. Brady; Ronald K. Aust

(57) ABSTRACT

An encoded wheel for a toner cartridge including a plate having preprogrammed indicia positioned at locations defined in relation to a clock face, the preprogrammed indicia including a start indicia positioned between about a 5:00 o'clock position and a 6:00 o'clock position, a stop indicia positioned at about a 9:00 o'clock position, at least one preselected cartridge characteristic indicia positioned between the start indicia and the stop indicia, and at least one measurement indicia located between about 200 degrees and about 230 degrees from said 6:00 o'clock position.

25 Claims, 17 Drawing Sheets

* cited by examiner

ENCODED WHEEL FOR A TONER CARTRIDGE

This application is a division of U.S. patent application Ser. No. 09/415,620 filed on Oct. 12, 1999, which is a continuation of U.S. patent application Ser. No. 08/975,389 filed on Nov. 20, 1997, now U.S. Pat. No. 6,009,285, which is a continuation of U.S. patent application Ser. No. 08/768,257 filed on Dec. 17, 1996, now U.S. Pat. No. 5,995,772, which is a continuation-in-part of U.S. patent application Ser. No. 08/602,648 filed on Feb. 16, 1996, now U.S. Pat. No. 5,634,169.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to Electrophotographic (EP) machines and more particularly relates to method and apparatus associated with replaceable supply cartridges for such machines wherein information concerning the cartridge is provided to the machine to promote correct and efficient operation thereof.

2. Description of Related Art

Many Electrophotographic output device (e.g., laser printers, copiers, fax machines etc.) manufacturers such as Lexmark International, Inc., have traditionally required information about the EP cartridge to be available to the output device such that the control of the machine can be altered to yield the best print quality and longest cartridge life.

The art is replete with devices or entry methods to inform the EP machine about specific EP cartridge characteristics. For example, U.S. Pat. No. 5,208,631 issued on May 4, 1993, discloses a technique to identify colorimetric properties of toner contained within a cartridge in a reproduction machine by imbedding in a PROM within the cartridge specific coordinates of a color coordinate system for mapping color data.

In other prior art, for example U.S. Pat. No. 5,289,242 issued on Feb. 22, 1994, there is disclosed a method and system for indicating the type of toner print cartridge which has been loaded into an EP printer. Essentially, this comprises a conductive strip mounted on the cartridge for mating with contacts in the machine when the lid or cover is closed. The sensor is a two position switch which tells the user the type of print cartridge which has been loaded into the printer. While this method is effective, the amount of information that can be provided to the machine is limited.

In still other prior art, such as U.S. Pat. No. 5,365,312 issued on Nov. 15, 1994, a memory chip containing information about the current fill status or other status data is retained. The depleted status of print medium is supplied by counting consumption empirically. The average of how much tone is required for toning a charge image is multiplied by the number of revolutions of the charge image carrier or by the degree of inking of the characters via an optical sensor. In either method, the count is less than accurate and depends upon average ink coverage on the page, or alternatively, the character density which can change dramatically due to font selection. Therefore at best, the consumption count lacks accuracy.

The literature suggests several methods for detecting toner level in a laser printer. Most of these methods detect a low toner condition or whether toner is above or below a fixed level. Few methods or apparatus effectively measure the amount of unused toner remaining. As an example, Lexmark® printers currently employ an optical technique to detect a low toner condition. This method attempts to pass a beam of light through a section of the toner reservoir onto a photo sensor. Toner blocks the beam until its level drops below a preset height.

Another common method measures the effect of toner on a rotating agitator or toner paddle which stirs and moves the toner over a sill to present it to a toner adder roll, then developer roll and ultimately the PC Drum. The paddle's axis of rotation is horizontal. As it proceeds through it's full 360 degree rotation the paddle enters and exits the toner supply. Between the point where the paddle contacts the toner surface and the point where it exits the toner, the toner resists the motion of the paddle and produces a torque load on the paddle shaft. Low toner is detected by either 1) detecting if the torque load caused by the presence of toner is below a given threshold at a fixed paddle location or 2) detecting if the surface of the toner is below a fixed height.

In either method there is a driving member supplying drive torque to a driven member (the paddle) which experiences a load torque when contacting the toner. Some degree of freedom exists for these two members to rotate independently of each other in a carefully defined manner. For the first method 1) above, with no load applied to the paddle, both members rotate together. However, when loaded the paddle lags the driving member by an angular distance that increases with increasing load. In the second method 2), the unloaded paddle leads the rotation of the driving member, under the force of a spring or gravity. When loaded (i.e., the paddle contacts the surface of the toner), the driving and driven members come back into alignment and rotate together. By measuring the relative rotational displacement of the driving and driven members (a.k.a. phase difference) at an appropriate place in the paddle's rotation, the presence of toner can be sensed.

In the prior art, this relative displacement is sensed by measuring the phase difference of two disks. The first disk is rigidly attached to a shaft that provides the driving torque for the paddle. The second disk is rigidly attached to the shaft of the paddle and in proximity to the first disk. Usually both disks have matching notches or slots in them. The alignment of the slots or notches, that is how much they overlap, indicates the phase relationship of the disks and therefore the phase of the driving and driven members.

Various art showing the above methods and variations are set forth below.

In U.S. Pat. No. 4,003,258, issued on Jan. 18, 1977 to Ricoh Co., is disclosed the use of two disks to measure toner paddle location relative to the paddle drive shaft. When the paddle reaches the top of its rotation the coupling between paddle and drive shaft allows the paddle to free fall under the force of gravity until it comes to rest on the toner surface or at the bottom of its rotation. Toner low is detected if the angle through which the paddle falls is greater than a fixed amount (close to 180 degrees). A spring connects the two disks, but the spring is not used for toner detection. It is used to fling toner from the toner reservoir to the developer.

In U.S. Pat. No. 5,216,462, issued to Oki Electric Co., Jun. 1, 1993, is described a system where a spring connects two disks so that the phase separation of the disks indicates torque load on the paddle. An instability is noted in this type of system. It further describes a system similar to the Patent above where the paddle free falls from its top dead position on the surface of the toner. The position of the paddle is sensed through magnetic coupling to a level outside of the toner reservoir. This lever activates an optical switch when the paddle is near the bottom of its rotation. A low toner indication results when the time taken for the paddle to fall from top dead center to the bottom of the reservoir, as sensed by the optical switch, is less than a given value.

In U.S. Pat. No. 4,592,642, issued on Jun. 3, 1986 to Minolta Camera Co., is described a system that does not use the paddle directly to measure toner, but instead uses the motion of the paddle to lift a "float" above the surface of the toner and drop it back down on top of the toner surface. A switch is activated by the "float" when in the low toner position. If the "float" spends a substantial amount of time in the low toner position the device signals low toner. Although the patent implies that the amount of toner in the reservoir can be measured, the description indicates that it behaves in a very non-linear, almost binary way to merely detect a toner low state.

U.S. Pat. No. 4,989,754, issued on Feb. 5, 1991 to Xerox Corp., differs from the others in that there is no internal paddle to agitate or deliver toner. Instead the whole toner reservoir rotates about a horizontal axis. As the toner inside rotates with the reservoir it drags a rotatable lever along with it. When the toner level becomes low, the lever, no longer displaced from its home position by the movement of the toner, returns to its home position under the force of gravity. From this position the lever activates a switch to indicate low toner.

In still another U.S. Pat. No. 4,711,561, issued on Dec. 8, 1987 to Rank Xerox Limited, this patent describes a means of detecting when a waste toner tank is full. It employs a float that gets pushed upward by waste toner fed into the tank from the bottom. The float activates a switch when it reaches the top of the tank.

U.S. Pat. No. 5,036,363, issued on Jul. 30, 1991 to Fujitsu Limited, describes the use of a commercially available vibration sensor to detect the presence of toner at a fixed level. The patent describes a simple timing method for ignoring the effect of the sensor cleaning mechanism on the sensor output.

U.S. Pat. No. 5,349,377, issued on Sep. 20, 1994 to Xerox Corp. discloses an algorithm for calculating toner usage and hence amount of toner remaining in the reservoir by counting black pixels and weighting them for toner usage based on pixels per unit area in the pixel's neighborhood. This is unlike the inventive method and apparatus disclosed hereinafter.

SUMMARY OF THE INVENTION

The present invention is related to apparatus and method for representing cartridge characteristic information by an encoded device, and for reading such information from the encoded device.

One aspect of the invention is directed to a toner cartridge including a sump for carrying a supply of toner. An agitator is rotatably mounted in the sump, and the agitator has a first end and a second end. An encoded wheel is coupled to the first end of the agitator. The encoded wheel is structured and adapted to include a first preselected cartridge characteristic indicia having a first extent, a stop indicia having a second extent larger than the first extent and a start indicia having a third extent larger than the second extent. In a most preferred embodiment, each indicia is in the form of a slot.

Another aspect of the invention is directed to a toner cartridge including a sump for carrying a supply of toner. An agitator is rotatably mounted in the sump. The agitator has a first end and a second end. An encoded wheel is coupled to the first end of the agitator. The encoded wheel includes preprogrammed indicia positioned at locations defined in relation to a clock face. The preprogrammed indicia include a start indicia positioned between about a 5:00 o'clock position and a 6:00 o'clock position, a stop indicia positioned at about a 9:00 o'clock position, at least one preselected cartridge characteristic indicia positioned between the start indicia and the stop indicia, and at least one measurement indicia located between about 200 degrees and about 230 degrees in a clockwise direction from the 6:00 o'clock position.

Other features and advantages of the invention may be determined from the drawings and detailed description of the invention that follows.

DESCRIPTION OF THE ILLUSTRATIVE EMBODIMENTS

Figure 1:
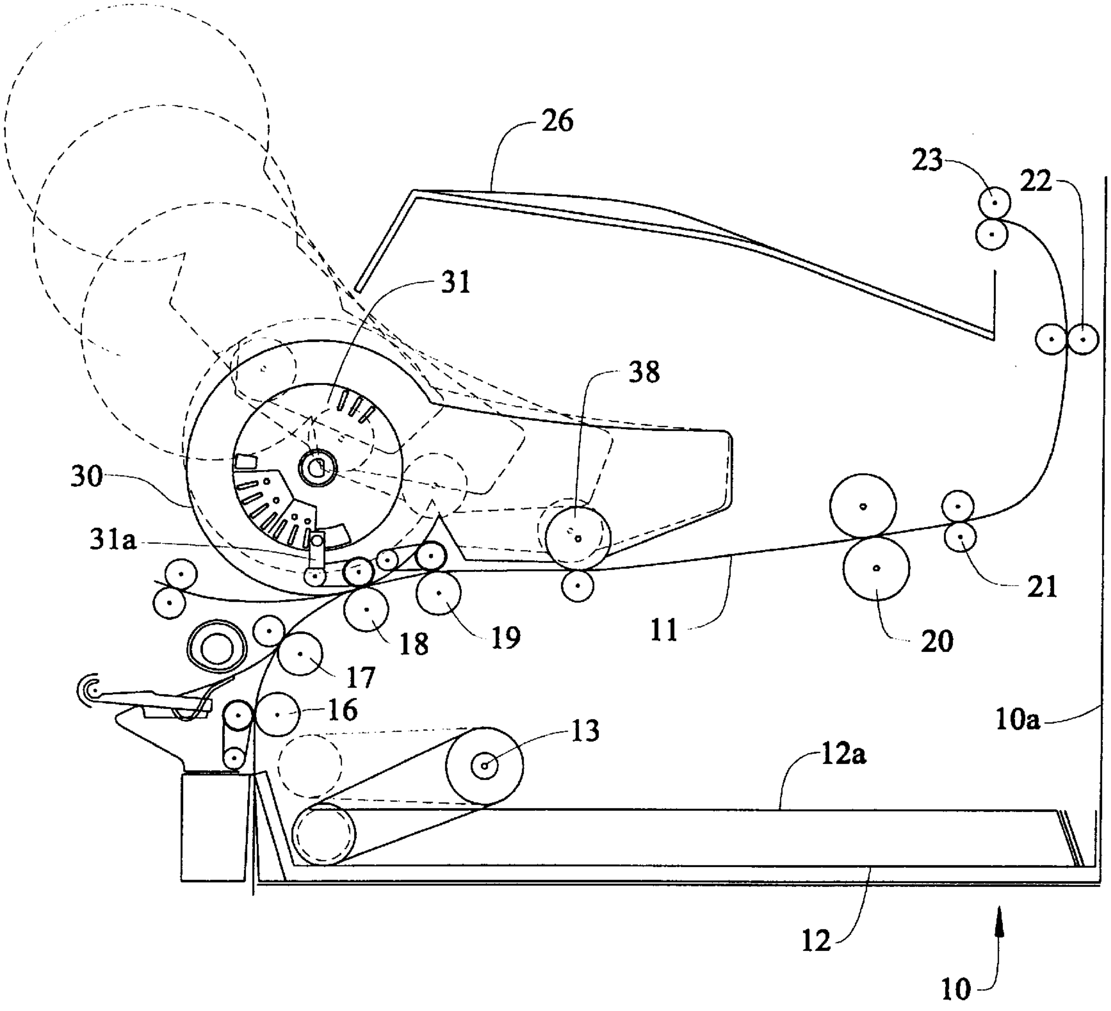
FIG. 1 is a schematic side elevational view illustrating the paper path in a typical electrophotographic machine, in the illustrated instance a printer, and showing a replacement supply EP cartridge, constructed in accordance with the present invention, and the manner of insertion thereof into the machine.

Turning now to the drawings, and particularly FIG. 1 thereof, a laser printer 10 constructed in accordance with the present invention, is illustrated therein. FIG. 1 shows a schematic side elevational view of the printer 10, illustrating the print receiving media path 11 and including a replacement apply electrophotographic (EP) cartridge 30, constructed in accordance with the present invention. As illustrated, the machine 10 includes a casing or housing 10*a* which supports at least one media supply tray 12, which by way of a picker arm 13, feeds cut sheets of print receiving media 12*a* (e.g., paper) into the media path 11, past the print engine which forms in the present instance part of the cartridge 30, and through the machine 10. A transport motor drive assembly 15 (FIG. 3) affords the driving action for feeding the media through and between the nips of pinch roller pairs 16–23 into a media receiving output tray 26.

Figure 2:
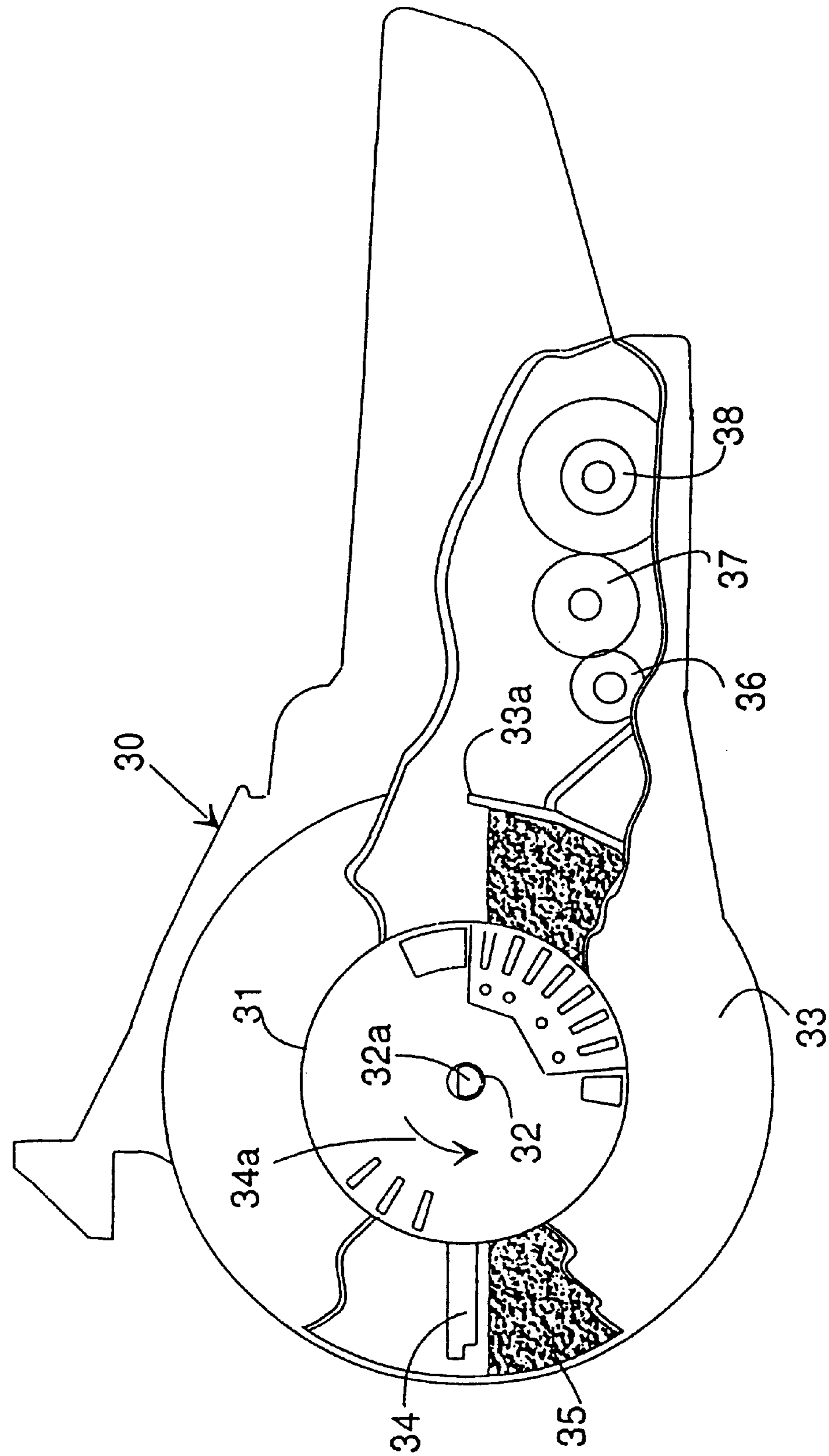
FIG. 2 is a fragmentary, enlarged, simplified, side elevational view of the cartridge illustrated in FIG. 1, and removed from the machine of FIG. 1.
Figure 3:
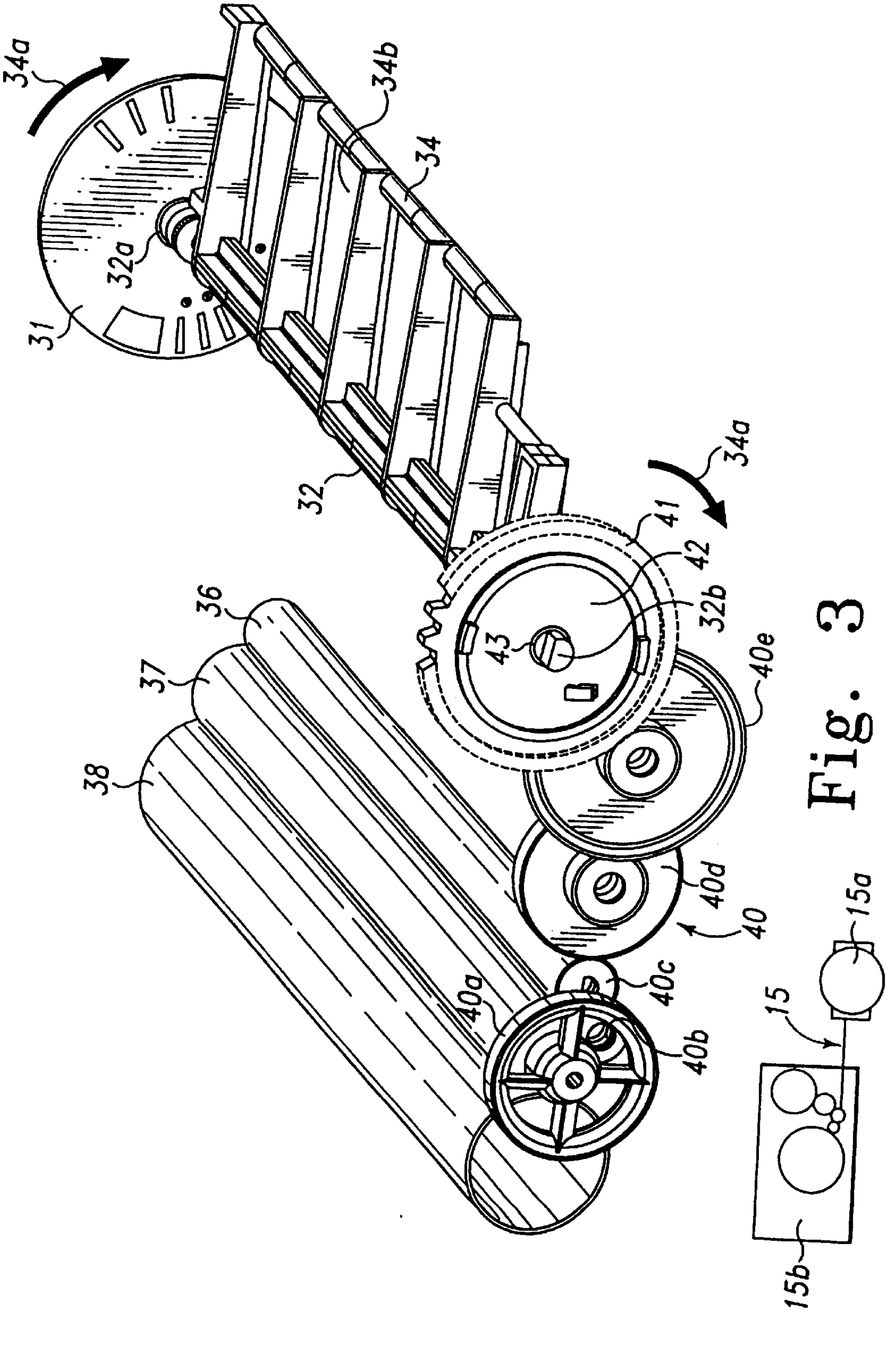
FIG. 3 is a fragmentary perspective view of the interior driven parts of the EP cartridge illustrated in FIGS. 1 and 2, including the encoder wheel and its relative position with regard to the drive mechanism for the cartridge interior driven parts.

In accordance with the invention, and referring now to FIGS. 1 & 2, the cartridge 30 includes an encoder wheel 31 adapted for coaction, when the cartridge 30 is nested in its home position within the machine 10, with an encoder wheel sensor or reader 31*a* for conveying or transmitting to the machine 10 information concerning cartridge characteristics including continuing data (while the machine is running) concerning the amount of toner remaining within the cartridge and/or preselected cartridge characteristics, such as for example, cartridge type or size, toner capacity, toner type, photoconductive drum type, etc. To this end, the encoder wheel 31 is mounted, in the illustrated instance on one end 32*a* of a shaft 32, which shaft is coaxially mounted for rotation within a cylindrical toner supply sump 33. Mounted on the shaft 32 for synchronous rotation with the encoder wheel 31, extending radially from the shaft 32 and axially along the sump 33 is a toner agitator or paddle 34. The toner 35 level for a cartridge (depending upon capacity) is generally as shown extending from approximately to 9:00 position and then counter clockwise to the 3:00 position. As the paddle 34 rotates counter clockwise in the direction of the arrow 34*a*, toner tends to be moved over the sill 33*a* of the sump 33. (The paddle 34 is conventionally provided with large openings 34*b*, FIG. 3, to provide lower resistance thereto as it passes through the toner 35.) As best shown in FIGS. 2 & 3, the toner that is moved over the sill 33*a*, is presented to a toner adder roll 36, which interacts in a known manner with a developer roll 37 and then a photo conductive (PC) drum 38 which is in the media path 11 for applying text and graphical information to the print receiving media 12*a* presented thereto in the media path 11.

Referring now to FIG. 3, the motor transport assembly 15 includes a drive motor 15*a*, which is coupled through suitable gearing and drive take-offs 15*b* to provide multiple and differing drive rotation to, for example, the PC drum 38 and a drive train 40 for the developer roll 37, the toner adder roll 36 and through a variable torque arrangement, to one end 32*b* of the shaft 32. The drive motor 15*a* may be of any convenient type, e.g., a stepping motor or in the preferred embodiment a brushless DC motor. While any of several types of motors may be employed for the drive, including stepping motors, a brushless DC motor is ideal because of the availability of either hall effect or frequency generated feedback pulses which present measurable and finite increments of movement of the motor shaft. The feedback accounts for a predetermined distance measurement, which will be referred to as an increment rather than a 'step' so as not to limit the drive to a stepping motor.

Figure 5B:
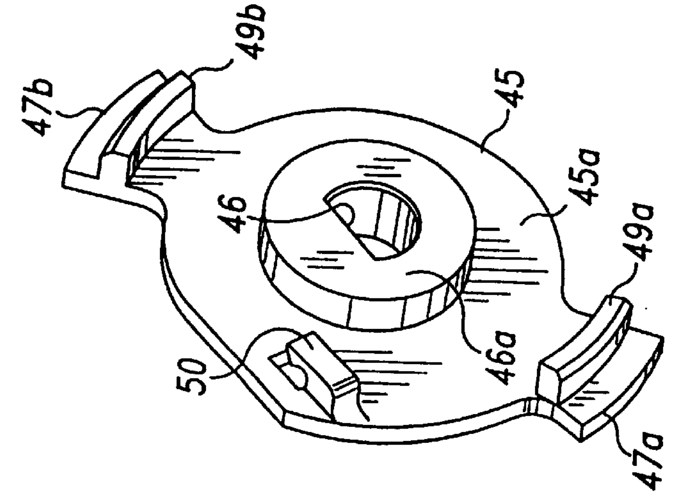
FIG. 5B depicts the reverse side of one-half of the torque sensitive coupling, and that portion which connects to the agitator/paddle shaft.

The drive train 40, which in the present instance forms part of the cartridge 30, includes driven gear 40*a*, which is directly coupled to the developer roll 37, and through an idler gear 40*b* is coupled to the toner adder roll 36 by gear 40*c*. Gear 40*c* in turn through suitable reduction gears 40*d* and 40*e* drives final drive gear 41. In a manner more fully explained below with reference to FIGS. 5 & 6, the drive gear 41 is coupled to the end 32*b* of shaft 32 through a variable torque sensitive coupling.

Figure 4:
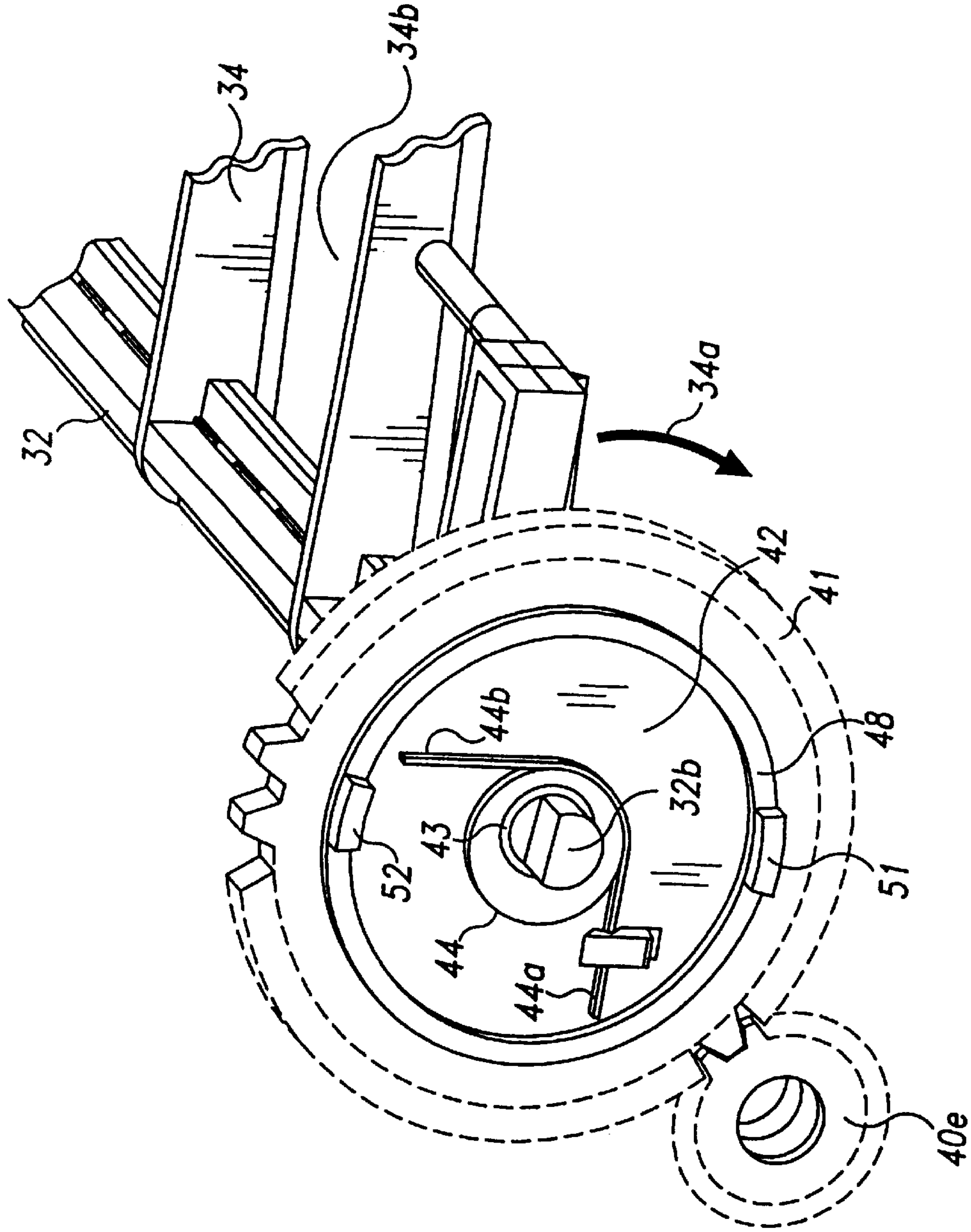
FIG. 4 is an enlarged fragmentary perspective view of the agitator/paddle drive for the toner sump, and illustrating a portion of the torque sensitive coupling between the drive gear and the driven shaft for the agitator/paddle.

In FIG. 3, the gear 41 is shown as including an attached web or flange 42 connected to a collar 43 which acts as a bearing permitting, absent restraint, free movement of the gear 41 and its web 42 about the end 32*b* of the shaft 32. Referring now to FIG. 4, the driving half of the variable torque sensitive coupling is mounted on the web 42 of the gear 41. To this end, the driving half of the coupling includes a coiled torsion spring 44, one leg 44*a* of which is secured to the web 42 of the gear 41, the other leg 44*b* of which is free standing.

Figure 5A:
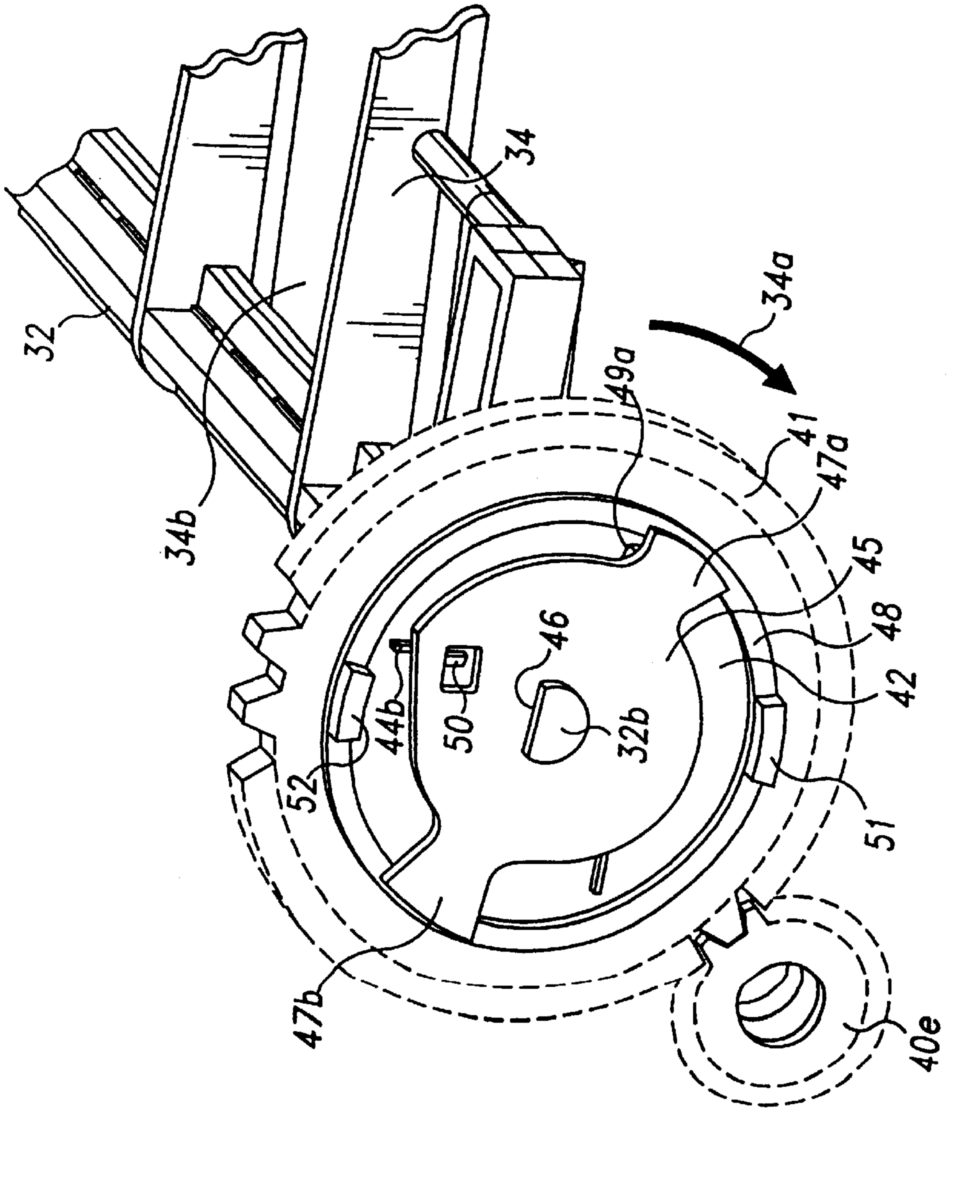
FIG. 5A is a fragmentary view similar to FIG. 4, except illustrating another portion of the torque sensitive coupling for coupling the driven shaft for the agitator/paddle, through the coupling to the drive gear.

Turning now to FIG. 5A, the other half (driven half) of the coupling is illustrated therein. To this end, an arbor 45 having a keyed central opening 46 dimensioned for receiving the keyed (flat) shaft end 32*b* of the shaft 32, is depicted therein. For ease of understanding, an inset drawing is provided wherein the reverse side of the arbor 45 is shown. The arbor 45 includes radially extending ear potions 47*a*, 47*b*, the extended terminal ends of which overlay the flange 48 associated with the web 42 of the gear 41. The rear face or back surface 45*a* of the arbor 45 (see FIG. 5B) confronting the web 42, includes depending, reinforcing leg portions 49*a*, 49*b*. A collar 46*a* abuts the web 42 of the gear 41 and maintains the remaining portion of the arbor 45 spaced from the web 42 of the gear 41. Also attached to the rear of the back surface 45*a* of the arbor 45 is a clip 50 which grasps the free standing leg 44*b* of the spring 44.

Thus one end 44*a* (FIG. 4) of the spring 44 is connected to the web 42 of the gear 41, while the other end 44*b* of the spring 44 is connected to the arbor 45 which is in turn keyed to the shaft 32 mounted for rotation in and through the sump 33 of the cartridge 30. Therefore the gear 41 is connected to the shaft 32 through the spring 44 and the arbor 45. As the gear 41 rotates, the end 44*b* of the spring presses against the catch 50 in the arbor 45 which tends to rotate causing the paddle 34 on the shaft 32 to rotate. When the paddle first engages the toner 35 in the sump 33, the added resistance causes an increase in torsion and the spring 44 tends to wind up thereby causing the encoder wheel 31 to lag the rotational position of the gear 41. Stops 51 and 52 mounted on the flange 48 prevent over winding or excessive stressing of the spring 44. In instances where the sump 33 is at the full design level of toner 35, the ears 47*a,* 47*b* engage the stops 52 and 51 respectively. The spring 44 therefore allows the paddle shaft 32 to lag relative to the gear 41 and the drive train 40 because of the resistance encountered against the toner 35 as the paddle 34 attempts to move through the sump 33. The more resistance encountered because of toner against the paddle 34, the greater the lag. As shall be described in more detail hereinafter, the difference in distance traveled by the gear 41 (really the motor 15*a*) and the encoder wheel 31, as the paddle 34 traverses the sump 33 counter clockwise from the 9:00 position (see FIG. 2) to about the 5:00 position, is a measure of how much toner 35 remains in the sump 33, and therefore how many pages may yet be printed by the EP machine or printer 10 before the cartridge 30 is low on toner. This measurement technique will be explained more fully with regard to finding the home position of the encoder wheel 31 and reading the wheel.

Figure 6:
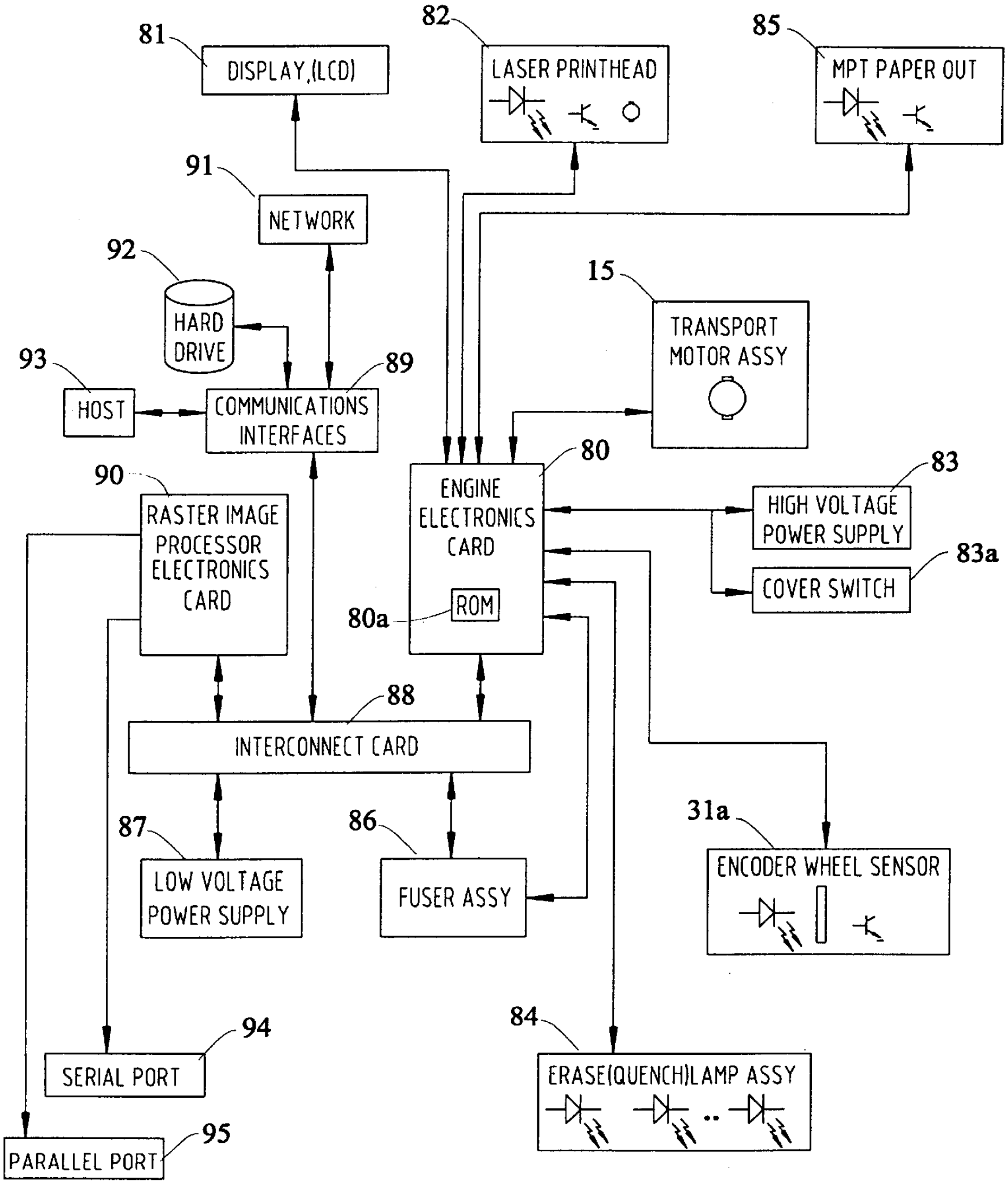
FIG. 6 is a simplified electrical diagram for the machine of FIG. 1, and illustrating the principal parts of the electrical circuit.

Turning now to FIG. 6 which is a simplified electrical diagram for the machine 10, illustrating the principal parts of the electrical circuit thereof, the machine employs two processor (micro-processor) carrying boards 80 and 90, respectively labeled "Engine Electronics Card" and "Raster Image Processor Electronics Card" (hereinafter called EEC and RIP respectively). As is conventional with processors, they include memory, I/O and other accouterments associated with small system computers on a board. The EEC 80, as shown in FIG. 6, controls machine functions, generally through programs contained in the ROM 80*a* on the card and in conjunction with its on-board processor. For example, on the machine, the laser printhead 82; the motor transport assembly 15; the high voltage power supply 83 and a cover switch 83*a* which indicates a change of state to the EEC 80 when the cover is opened: the Encoder Wheel Sensor 31*a* which reads the code on the encoder wheel 31 informing the EEC 80 needed cartridge information and giving continuing data concerning the toner supply in the sump 33 of the EP cartridge 30; a display 81 which indicates various machine conditions to the operator, under control of the RIP when the machine is operating but capable of being controlled by the EEC during manufacturing, the display being useful for displaying manufacturing test conditions even when the RIP is not installed. Other functions such as the Erase or quench lamp assembly 84 and the MPT paper-out functions are illustrated as being controlled by the EEC 80. Other shared functions, e.g., the Fuser Assembly 86 and the Low Voltage Power Supply 87 are provided through an interconnect card 88 (which includes bussing and power lines) which permits communication between the RIP 90 and the EEC 80, and other peripherals. The Interconnect card 88 may be connected to other peripherals through a communications interface 89 which is available for connection to a network 91, non-volatile memory 92 (e.g., Hard drive), and of course connection to a host 93, e.g., a computer such as a personal computer and the like.

The RIP primarily functions to receive the information to be printed from the network or host and converts the same to a bit map and the like for printing. Although the serial port 94 and the parallel port 95 are illustrated as being separable from the RIP card 90, conventionally they may be positioned on or as part of the card.

Prior to discussing, via the programming flow chart, the operation of the machine in accordance with the invention, the structure of the novel encoder wheel 31 should be described. To this end, and referring now to FIG. 7, the encoder wheel 31 is preferably disk shaped and comprises a keyed central opening 31*b* for receipt by like shaped end 32*a* of the shaft 32. The wheel includes several slots or windows therein which are positioned preferably with respect to a start datum line labeled D0, for purposes of identification. From a "clock face" vive. D0 resides at 6:00, along the trailing edge of a start/home window 54 of the wheel 31. (Note the direction of rotation arrow 34*a*.) The paddle 34 is schematically shown positioned at top-dead-center (TDC) with respect to the wheel 31 (and thus the sump 33). The position of the encoder wheel sensor 31*a,* although stationary and attached to the machine, is assumed, for discussion purposes, aligned with D0 in the drawing and positioned substantially as shown schematically in FIG. 1.

Because the paddle 34 is generally out of contact with the toner in the sump, from the 3:00 position to the 9:00 position (counter clockwise rotation as shown by arrow 34*a*), and the shaft velocity may be assumed to be fairly uniform when the paddle moves from at least the 12:00 (TDC) position to the 9:00 position, information concerning the cartridge 30 is preferably encoded on the wheel between 6:00 and approximately the 9:00 position. To this end, the wheel 31 is provided with radially extending, equally spaced apart, slots or windows 0–6, the trailing edges of which are located with respect to D0 and labeled D1–D7 respectively. Each of the slots 0–6 represents an information or data bit position which may be selectively covered as by one or more decals 96, in a manner to be more fully explained hereinafter with reference to FIG. 10. Suffice at this point that a plurality of apertures 56–59 are located along an arc with the same radius but adjacent the data slots or windows 0–6. Note that the spacing between apertures 56 and 57 is less than the spacing between apertures 58 and 59.

The coded data represented by combinations of covered, not-covered slots 0–6 indicate to the EEC 80 necessary information as to the EP cartridge initial capacity, toner type, qualified or unqualified as an OEM type cartridge, or such other information that is either desirable or necessary for correct machine operation. Adjacent slot 6 is a stop window 55 which has a width equal to the distance between the trailing edges of adjacent slots or windows, e.g., D1=(D2–D1,=D3–D2 etc.)=the width of window 55. Note that the stop window 55 is also spaced from the trailing edge of slot 6 a distance equal to the stop window width 55. That is, the distance D8–D7=twice the window 55 width while the window width of window 55 is greater than the width of the slot 0–6.

Adjacent slot 0, from approximately the 5:00 to the 6:00 position is a start/home window 54. The start/home window 54 is deliberately made larger than any other window width. Because of this width difference, it is easier to determine the wheel position and the start of the data bit presentation to the encoder wheel sensor 31*a*. The reason for this will be better understood when discussing the programming flow charts of FIGS. 8A and 8B.

In order to provide information to the EEC 80 as to the lag of the encoder wheel 31 relative to the transport motor 15*a* position (counted increments), three additional slots or windows "a", "b" and "c" are provided at D9, D10 and D11 respectively. The trailing edge of slot "a", (angular distance D9) is 200° from D0; the trailing edge of slot "b" (angular distance D10) is 215° from D0 and the trailing edge of slot "c" (angular distance D11) is 230° from D0. From FIG. 7 it may be seen that when the slot "a" passes the sensor 31*a* at D0, the paddle 34 will have already passed bottom dead center (6:00 position) by 20°, (200°–180°); window or slot "b" by 35° (215°–180°), and slot "c" by 50° (230°–180°). The significance of the placement of the slots "a", "b" and "c" will be more fully explained, hereinafter, with respect to FIG. 9.

Figure 8A:
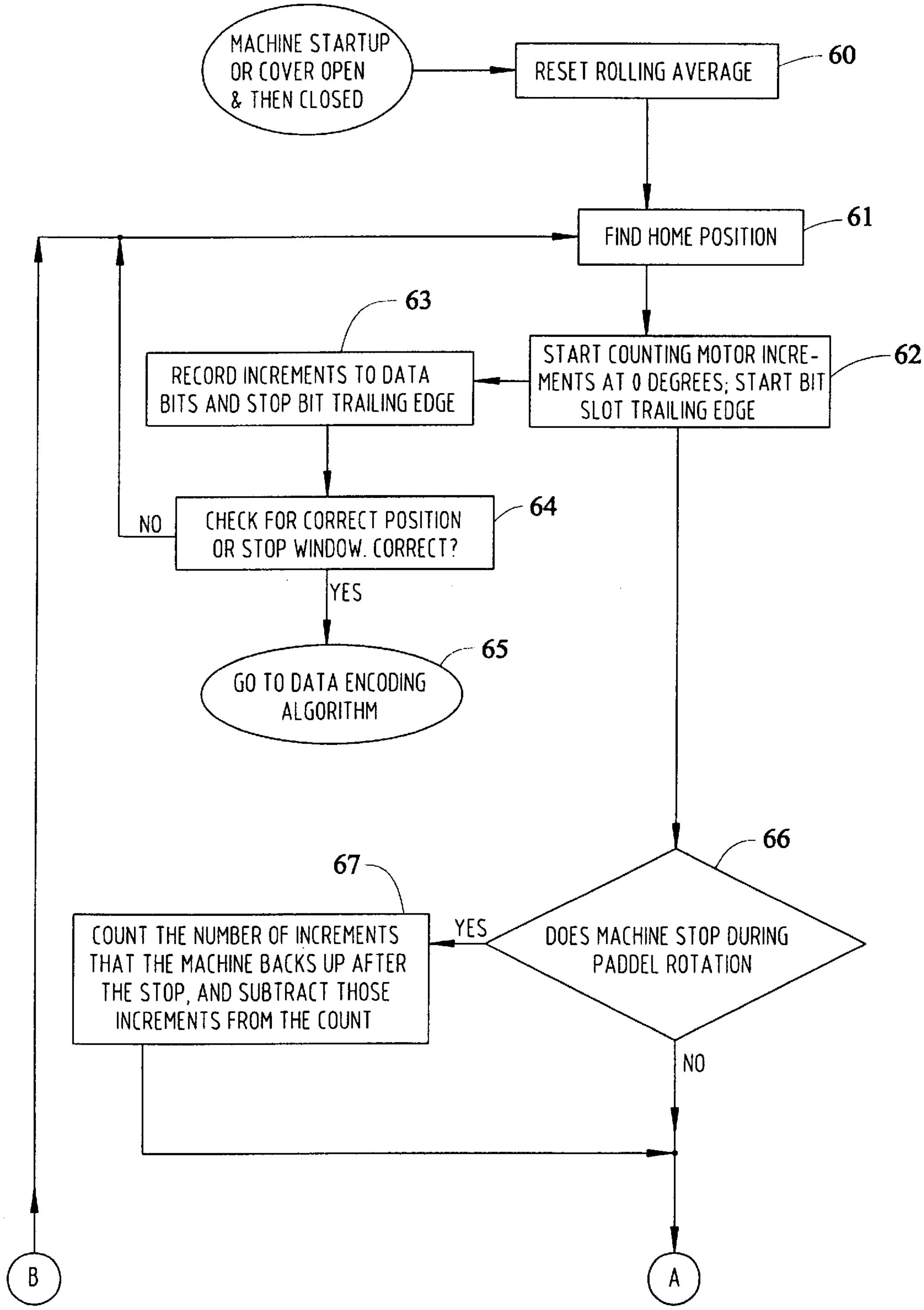
FIG. 8A is a first portion of a flow chart illustrating the code necessary for machine start up, and the reading of information coded on the encoder wheel.
Figure 8B:
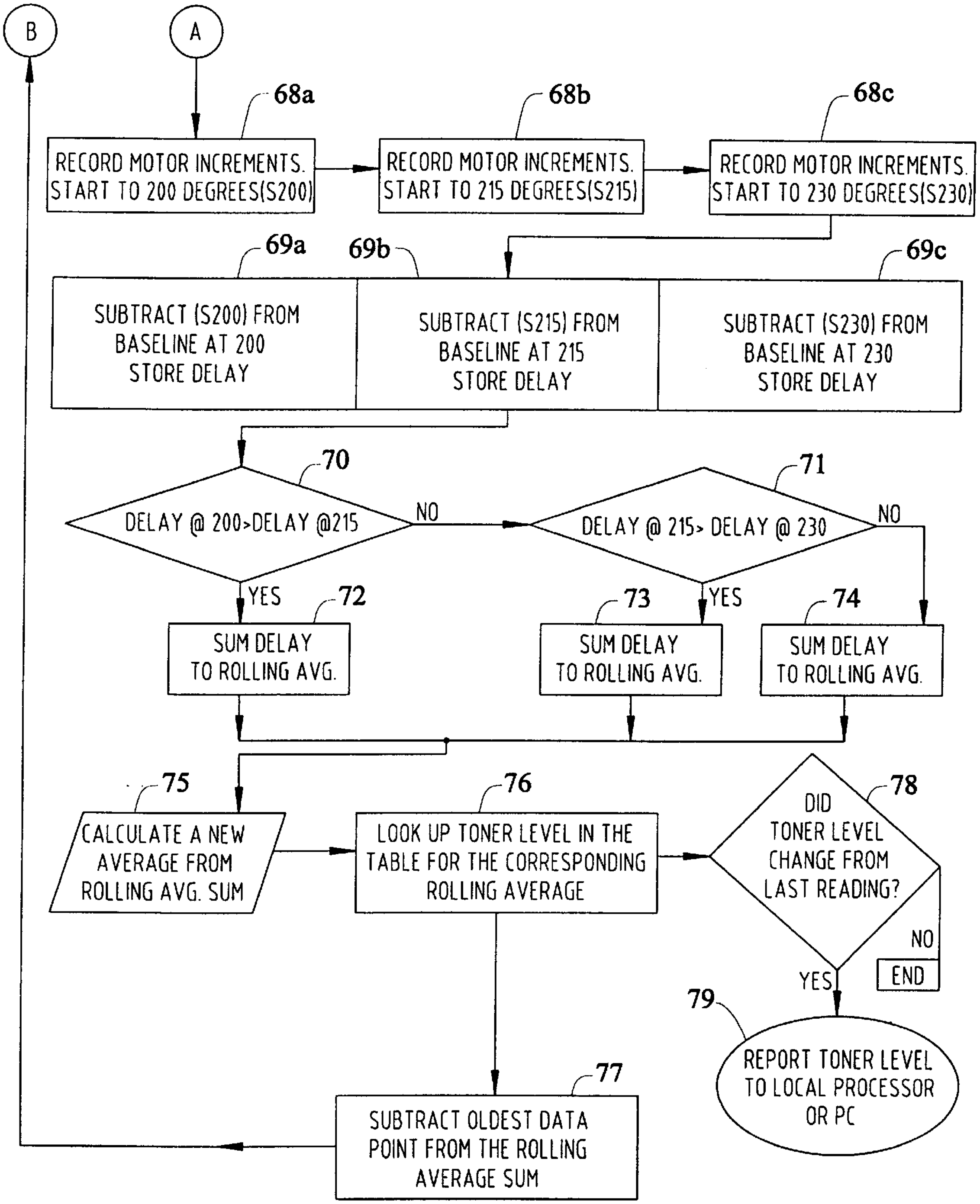
FIG. 8B is a second portion of the flow chart of FIG. 8A illustrating the measurement of toner level in the toner sump.

Referring now to FIGS. 8A and 8B which shows respectively a programming and functional flow chart illustrating the code necessary for machine start up, and the reading of information coded on the encoder wheel, including the measurement of toner 35 level in the toner sump 33. At the outset, it is well that it be understood that there is no reliance on or measurement of the speed of the machine, as it differs depending upon the operation (i.e., resolution; toner type; color etc.) even though a different table may be required for look up under gross or extreme speed change conditions. Accordingly, rather than store in the ROM 80*a* a norm for each of several speeds to obtain different resolutions to which the actual could be compared to determine the amount of tone left, what is read instead is the angular 'distance' traversed by the encoder wheel 31 referenced to the angular distance traveled by the motor, and then comparing the difference between two angular measurements to a norm or base-line to determine the amount of toner 35 left in the sump 33. By observation, it can be seen that the distance that the encoder wheel travels between start or home (D0) and "a", "b", "c" is always the same. So what is being measured is the distance the motor has to travel before slot "a" is sensed, slot "b" is sensed and slot "c" is sensed, and then taking the difference as being the measured lag. In essence, and perhaps an easier way for the reader to understand what is being measured, is that the angular displacement of the paddle 34 is being measured with respect to the angular displacement of the gear 41 (gear train 40 as part of transport motor assembly 15). As discussed below, the greatest number (lag number) indicates the paddle position which gives the highest torque (the most resistance). This number indicates which look up table in ROM should be employed and gives a measure of how much toner 35 is left in the sump 33 of the cartridge 30.

Referring first to FIG. 8A, after machine 10 start up or the cover has been opened and later closed, the Rolling Average is reset, as shown in logic block 60. Simply stated, 'n' (e.g., 5 or 6) sample measurements are examined and the average of them is stored and the code on the encoder wheel 31 of the cartridge 30 is read, compared to what was there before, and then stored. The reason for doing this is that if a user replaces an EP cartridge since the last power on or machine 10 startup, there may be a different toner type, toner level etc. in the new sump. Accordingly, so as not to rely on the old data, new data is secured which includes new cartridge data and/or amount of toner 35 remaining in the cartridge 30. Therefore a new 'rolling average' is created in the EEC 80. With regard to host notification, however, the old data would be reported because the great majority of time when the machine is started up or the cover is closed once opened, a new cartridge will not have been installed, and reliance may usually be placed upon the previous information.

The next logical step at 61 is to 'Find the Home position' of the encoder wheel 31. In order for either the toner level or cartridge characteristics algorithms to operate properly, the "home position" of the wheel 31 must first be found. Necessarily, the EEC 80, through sensor 31*a* must see the start of a window before it begins determining the home or start position of the wheel, since the engine could be stopped in, for instance, the stop window 55 position and due to backlash in the system, the motor may move enough distance before the encoder wheel actually moves that the measured "total window width" could appear to be the start/home window 54. Below is set forth in pseudo code the portion of the program for finding the start/home window 54. As previously discussed, the start/home window 54 is wider than the stop window 55 or for that matter, any other slot or window on the encoder wheel 31.

```
    'Find the home window first
    'This loop runs on motor "increments"
    HomeFound = False
    while (!HomeFound)
If (found the start of a Window) Then
    WindowWidth = 0
    While (not at the end of Window){increment WindowWidth}
            If (WindowWidth > MINIMUM_HOME_WIDTH
        AND WindowWidth < MAXIMUM_HOME_WIDTH) Then
            HomeFound = True
 End if
End While
```

In the above algorithm, 'HomeFound' is set false and a loop is run until the window or slot width meets the conditions of greater than minimum but less than maximum, then 'HomeFound' will be set true and the loop is ended. So the algorithm in essence is articulating: see the window; compare the window with predetermined minimum and maximum widths, for identification; and then indicate that the 'home window' 54 has been found when those conditions are met.

To ensure that the algorithm found home properly, after it identifies the stop window 55, it checks to ensure that the position of the stop window 55 is within reason with respect to the start/home window 54 and of course that the window width is acceptable. This occurs in logic blocks or steps 62, 63 and 64 in FIG. 8A. If this condition is not met, then the configuration information should be taken again. If this check passes, then there is no need to continue to look at the configuration information until a cover closed or power on cycle occurs. This guards against the potential conditions wherein the engine misidentifies the start/home window 54 and thus mis-characterizes the cartridge 30.

Figure 7:
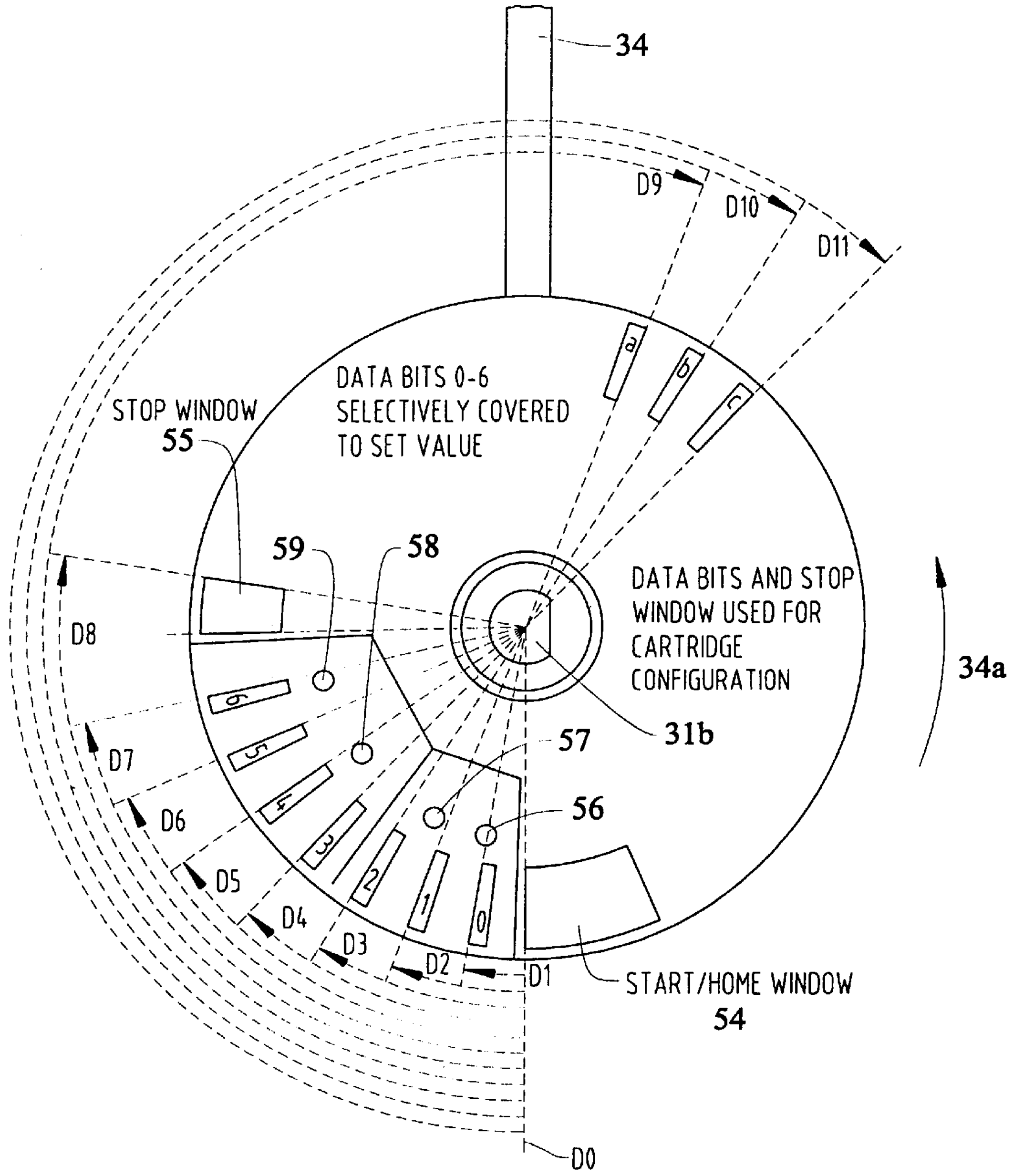
FIG. 7 is an enlarged side elevational view of the encoder wheel employed in accordance with the present invention, and viewed from the same side as shown in FIG. 2, and from the opposite side as shown in FIG. 3.

Prior to discussing the pseudo-code for 'Reading the Wheel', it may be helpful to recall that a portion of the encoder wheel's 31 revolution is close enough to constant velocity to allow that section to be used and read almost as a "windowed bar code". With reference to FIG. 7, that is the section of the wheel 31 from the trailing edge of the start/home window 54 to the trailing edge of the stop window 55 including the slots or windows 0–6. This is preferably in the section of the encoder wheel 31 in which the paddle 34 is not impinging upon or in the toner 35 in the sump 33. Passage of this section over the optical sensor 31*a* creates a serial bit stream which is decoded to gather read-only information about the cartridge. The information contained in this section may comprise information that is essential to the operation of the machine with that particular EP cartridge, or "nice to know" information. The information may be divided, for example into two or more different classifications. One may be cartridge 'build' specific, i.e., information which indicates cartridge size, toner capacity, toner type, photo conductor (PC) drum type, and is personalized when the cartridge is built, the other which may allow for a number of unique "cartridge classes" which may be personalized before cartridge shipment, depending, for example, upon the OEM destination. The latter classification may, for example inhibit the use of cartridges from vendors where it is felt that the cartridge will give inferior print, may have some safety concern, or damage the machine in some way. Alternatively, if the machine is supplied as an OEM unit to a vendor for his own logo, the cartridges may be coded so that his logo cartridge is that which is acceptable to the machine. The selective coding by blocking of the windows may be performed via a stick-on-decal operation which will be more fully explained with reference to FIG. 10.

The 'Find Home' code determines the start/home window 54 and measures the distance corresponding to the trailing edge of each window 0–6 from the trailing edge of the window 54. This acquisition continues until the engine detects the stop window 55 (which is designed to have a greater circumferential width then the data windows 0–6 but less than the start/home window 54). Using a few integer multiplications, the state of each bit in the byte read is set using the recorded distance of each window 0–6 from the trailing edge of the home window 54.

The portion of the program for reading the encoder wheel, in pseudo-code, is as follows:

of the slots 0–6 and < the width of the start/home window 54. Thus the line of pseudo code above 'First divide the number of samples taken by 9', (from the trailing edge of the start/home window or slot 54) means that there are 7 bits from D1 through D7, plus two more through D8, and therefore '/9' gives the spacing "K" between the windows (trailing edge of the start/home window 54 to the trailing edge of the stop window 55) which may be compared to what this distance is supposed to be, and in that manner insure that the bit windows 0–6 and stop window 55 have been found. If the stop window 55 is not identified correctly by the technique just described, then a branch from logic step 64 to logic step 61 will once again initiate the code for finding the home position, as in block 61 and described above.

In logic block or step 65, the next logical step in the program is to go to the Data Encoding Algorithm portion of

```
    'Find Home' (see above)
    'Gather distances for all of the data window
    'This loop runs on motor "increments'
    Finished = False
    WindowNumber < 0
    CumulativeCount < 0
    while (!Finished)
CumulativeCount = CumulativeCount + 1
If (the start of a window is found) Then
    WindowWidth = 0
    While (no at the end of Window)
    increment WindowWidth
    increment CumulativeCount
    End While
        If (WindowWidth > Minimum Stop window Width
        AND WindowWidth < Maximum Stop Window Width
            AND CumulativeCount > Minimum Stop Position
            AND CumulativeCount < Maximum Stop Position)Then
            'we must ensure that the stop window is really what we found
            Finished = True
            StopDistanceFromHome = CumulativeCount
        Else
        DistanceFromHome(WindowNumber) = CumulativeCount
        WindowNumber = WindowNumber + 1
    End If'check for start of window
End While
'Now translate measurements into physical bits
DataValue = 0
'First divide the number of samples taken by 9
BitDistance = StopDistanceFromHome/9
For 1 = 0 To WindowNumber - 1
    BitNumber = DistanceFromHome(I)/BitDistance
        'What is being determined is the bit number corresponding to the
            'measurement by rounding up DistanceFromHome(I)/BitDistance.
    If((DistanceFromHome(I)/-(BitDistance*BitNumber))*2 > BitDistance) Then
        BitNumber = BitNumber + 1
    End If
        DataValue = DataValue + 1(SHIFTLEFT) BitNumber - 1
Next'Window number
DataValue = -DataValue 'invert result since windows are logic 0's
```

The program depicted above in pseudo code for reading the wheel is quite straight forward. Thus in logic step 63, (FIG. 8A) where the motor increments are recorded for each data bit, and stop bit trailing edge, as was discussed with regard to FIG. 7 that the distances D1–D7 between the trailing edges of windows or slots 0 through 6, are equally spaced. (i.e., D7–D6=some constant "K", D5–D4=constant "K" etc.) The trailing edge of the stop window 55 is also a distance of twice "K" from the trailing edge of slot 6. While the distance from the trailing edge of stop window 55 to its leading edge (i.e., the window 55 width) is equal to one 'bit' distance or "K" from the leading edge, this width may be any convenient distance as long as its width is > than the width the program. In the pseudo code set forth above, this starts with the REM statement "'Now translate measurements into physical bits'". Now, assume that when coded, the encoder wheel 31 has several of the bits 0–6 covered, as by a decal so that light will not pass therethrough. Suppose all data bit slots but 6 and the stop window 55 are covered. A reading of distance D8/9 will give the spacing between the data slots or windows 0–6. Therefore, the distance to slot D7, i.e., the trailing edge of slot 6, will be 7 time "K" (bit spacing) and therefore will indicate the it is bit 7 that is emissive and that the bit representation is 1000000, or if the logic is inverted, 0111111. Notice that the number found is rounded up or down, as the case may be dependent upon such factors as paddle mass, rotational speed etc. In certain instances, this may mean rounding up with a reading above 0.2 and rounding down with a reading below 0.2. For example, 6.3 would be rounded to 7, while 7.15 would be rounded to a 7.

In logic step 66 the question is asked: "Does the machine stop during paddle rotation?". If it does, logic step 67 is initiated. The reason for this is that if the paddle is stopped, especially when in the portion of the sump 33 containing a quantity of toner 35, in order to release the torsion on the spring 44 the motor 15*a* is backed up several increments. This will allow removal, and/or replacement, if desired, of the EP cartridge 30. This logic step allows for decrementing the number of steps "backed up" from the incremental count of motor increments which was started in logic block 62.

Figure 9:
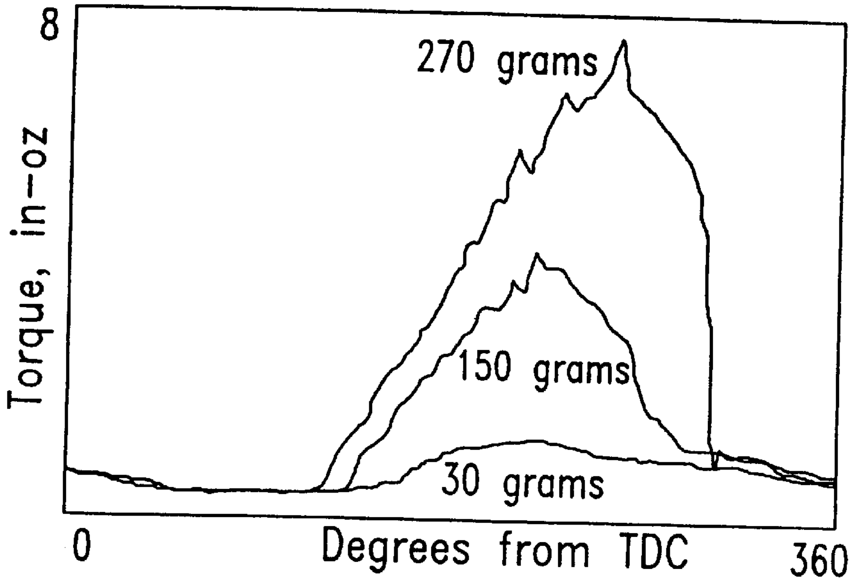
FIG. 9 is a graphical display of the torque curves for three different toner levels within the sump, and at various positions of the toner paddle relative to top dead center or the home position of the encoder wheel.

Turning now to FIG. 8B, as the encoder wheel 31 rotates, the paddle 34 enters the toner 35 in the sump 33. As described above relative to logic step 62, the motor increments are counted. The motor increments are then recorded as S200, S215 and S230, in logic step 68*a,* 68*b* and 68*c* at the trailing edges of slots "a", "b", and "c" respectively of the wheel 31. The numbers, S200, S215 and S230 are subtracted from the baseline of what the numbers would be absent toner 35 in the sump 33, (or any other selected norm) which is then directly indicative of the lag due to resistance of the toner in the sump, with the paddle 34 in three different positions in the sump. This is shown in logic steps 69*a*–69*c* respectively. As has previously been stated, there is a correlation between load torque on the toner paddle 34 and the amount of toner 35 remaining in the toner supply reservoir or sump 33. FIG. 9 illustrates this relationship. In FIG. 9, torque is set in inch-ounces on the ordinate and degrees of rotation of the paddle 34 on the abscissa.

Referring briefly to FIG. 9, several characteristics of this data stand out as indicating the amount of toner remaining. The first one is peak magnitude of the torque. For example, with 30 grams of toner 35 remaining in the sump 33, the torque is close to 2 inch-ounces, while at 150 grams the torque approximates 4 inch-ounces and at 270 grams the torque approximates 8 inch-ounces. The second characteristic is that the location of the peak of the torque curve does not move very much as the amount of toner changes. This suggests that measuring the torque near the location where the peak should occur could provide a measure of remaining toner. That is why, as shown in FIG. 7, the trailing edge of slot "a", (distance D9) is 200° from D0; the trailing edge of slot "b" (distance D10) is 215° from D0 and the trailing edge of slot "c" (distance D11) is 230° from D0. Another obvious indicator is the location of the onset of the torque load. Yet a third indicator is the area under the torque curves.

Another way of looking at this process is that while the angular distance measurements of D9, D10 and D11 are known, the number of increments the motor has to turn in order that the resistance is overcome as stored in the torsion spring 44, is the difference in distance the motor has to travel (rotational increments) to obtain a reading at window "a", then "b" and then "c". The delay is then compared as the logic step 70 and 71, and the largest delay is summed as at logic steps 72, 73 or 74 to the rolling average sum. Thereafter a new average calculation is made from the rolling average sum. This is shown in logic step 75. As illustrated in logic block 76, the toner 35 level in the sump 33 may then be determined from a look up table precalculated and stored in the ROM 80*a* associated with the EEC 80 in accordance with the new rolling average.

In logic block 77, the oldest data point is subtracted from the rolling average sum and then the rolling average sum is reported for use back to logic block 61 (Find Home position). If the toner level changed from the last measurement, as in compare logic block 78, this condition may be reported to the local RIP processor 90 and/or the host machine, e.g., a personal computer as indicated in logic block 79.

Coding of the encoder wheel 31 is accomplished, as briefly referred to above, by covering selected ones of slots 0–6 with a decal. For customization for an OEM vendee, and in order to reduce inventory, and in accordance with another feature of the invention, the problem of quickly and accurately applying such a decal to the correct area of the wheel 31, even under circumstances of limited space, is provided. Due to the close spacing of the slots 0–6 in the encoder wheel 31, a pre-cut, preferably adhesive backed decal 96 is employed to selectively cover pre-selected slots depending on how the decal is cut or stamped. Very accurate positioning of the decal 96 is achieved by use of alignment pins in conjunction with an alignment tool 100. Because another decal can be placed on another region of the wheel, the spacing of the alignment holes 56–59 on the encoder wheel 31 is different in each region.

Figure 10:
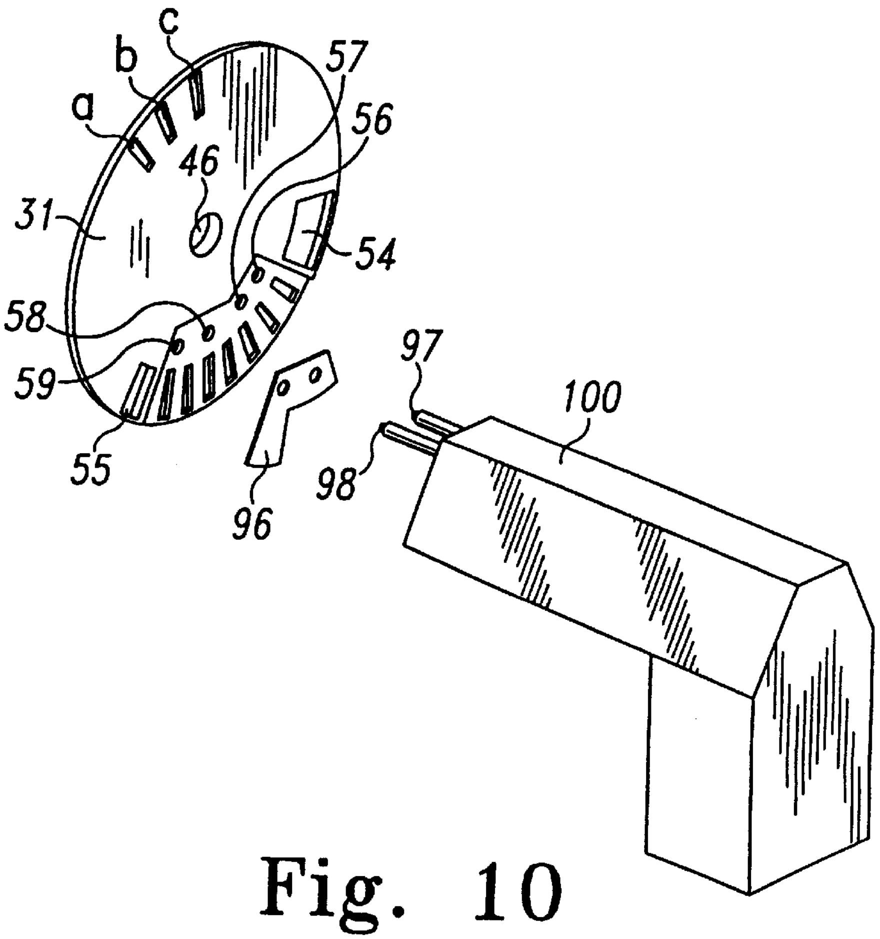
FIG. 10 is a perspective view of an encoder wheel with novel apparatus for blocking off selected slots in the encoder wheel for coding the wheel with EP cartridge information.

To this end, as previously discussed, there are two pairs of apertures in the encoder wheel or disk, adjacent the slots, the apertures of one of the pairs 58, 59 being spaced apart a greater distance than the apertures 56–57 of the other of the pairs. Referring now to FIG. 10, a decal 96 is sized to fit over at least one of the slots 0–2, or 3–6 to cover the same. As illustrated, the decal 96 has spaced apart apertures therein corresponding to one of the pairs of apertures, i.e., 58, 59 or 56, 57. A tool 100 has a pair of pins 97, 98 projecting therefrom and corresponding to the spacing of one of the pairs of apertures, whereby when the apertures in the decal are mated with the projecting pins of the tool, the projecting pins of the tool may be mated with the one pair of apertures in the encoder wheel or disk to thereby accurately position the decal over the selected slot in the disk. The decal 96 is installed on the tool with the adhesive side facing away from the too. The tool 100 is then pushed until the decal 96 makes firm contact with the surface of the wheel.

If the pins 97 and 98 are spaced equal to the spacing between apertures 56 and 57, the decal cannot, once on the tool 100, be placed covering slot associated with the incorrect apertures 58 and 59. The opposite condition is also true. Accordingly, two such tools 100 with different pin 97, 98 spacing may be provided to insure proper placement of the correct decal for the proper slot coverage. Alternatively, a single tool 100 with an extra hole for receipt of a transferred pin to provide the correct spacing, may be provided.

This method of selective bit blocking is preferred because the process is done at the end of the manufacturing line where less than all of the wheel 31 may be exposed. Use of this tool 100 with differing spaced apart pins allows the operator to get to the encoder wheel 31 easily and prevents misplacement of the decal.

Figure 11A:
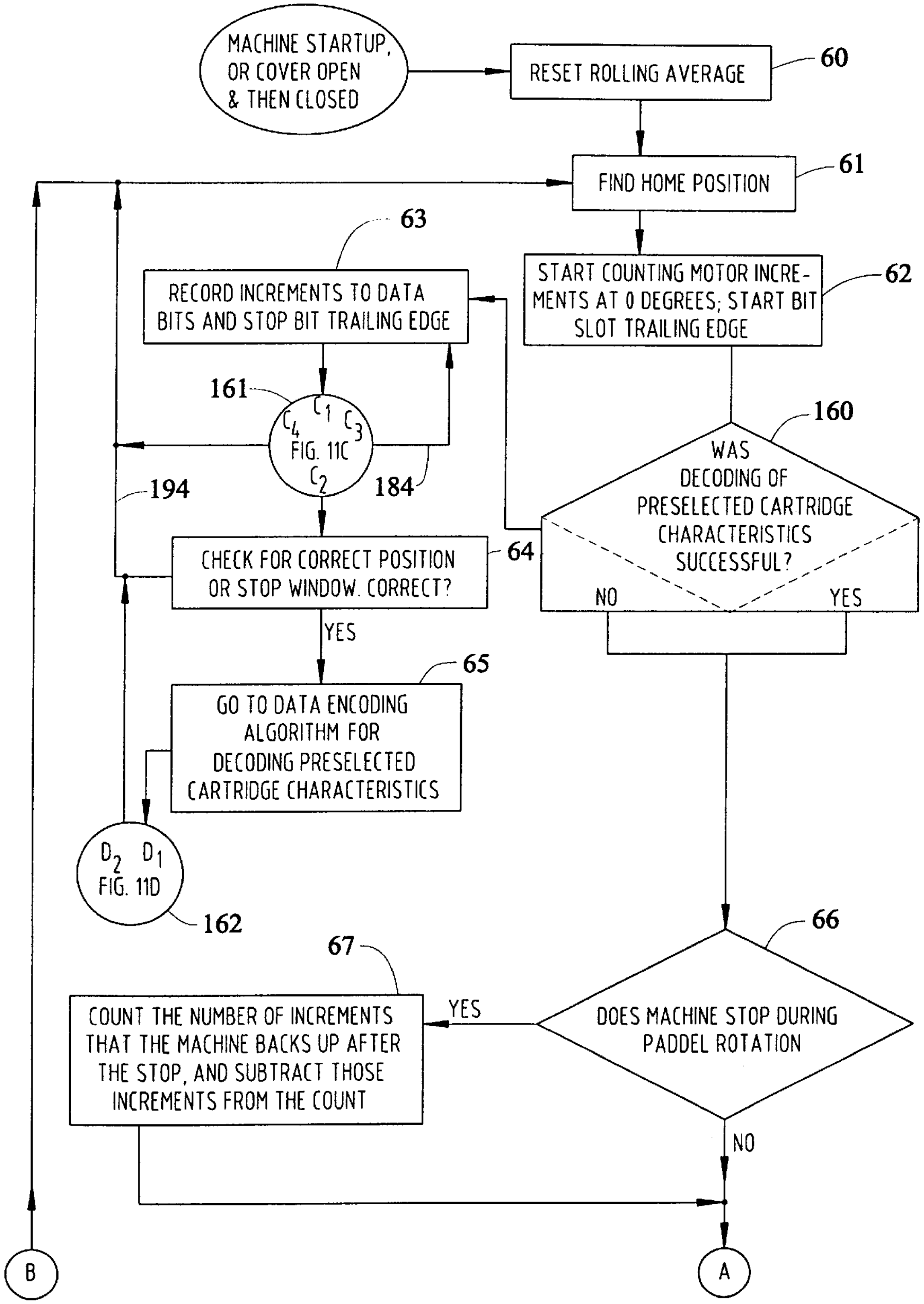
FIGS. 11A–11E represent in flow chart form an alternative method for machine start up, the reading of information coded on the encoder wheel and the measurement of toner level in the toner sump.
Figure 11B:
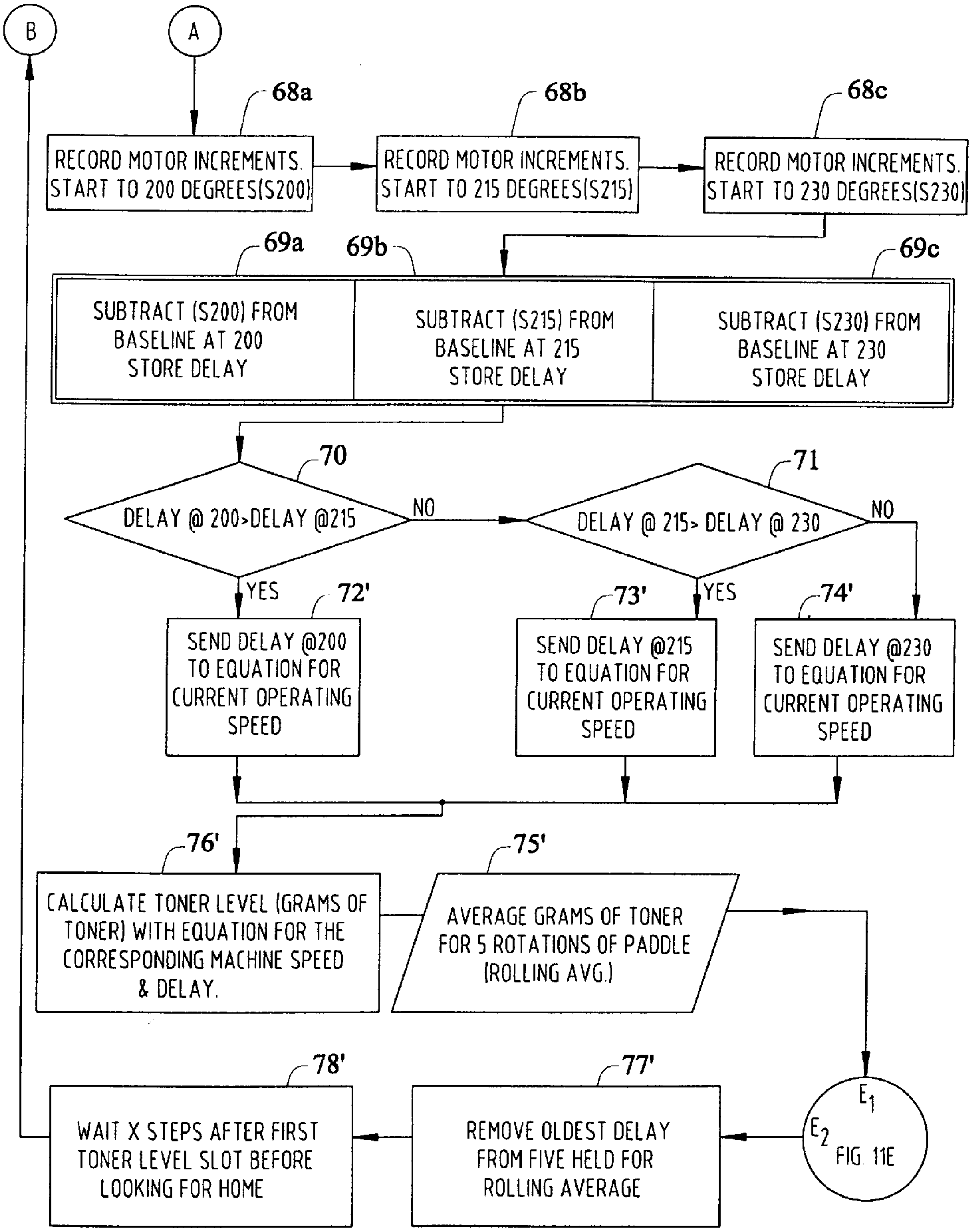
Figure 11C:
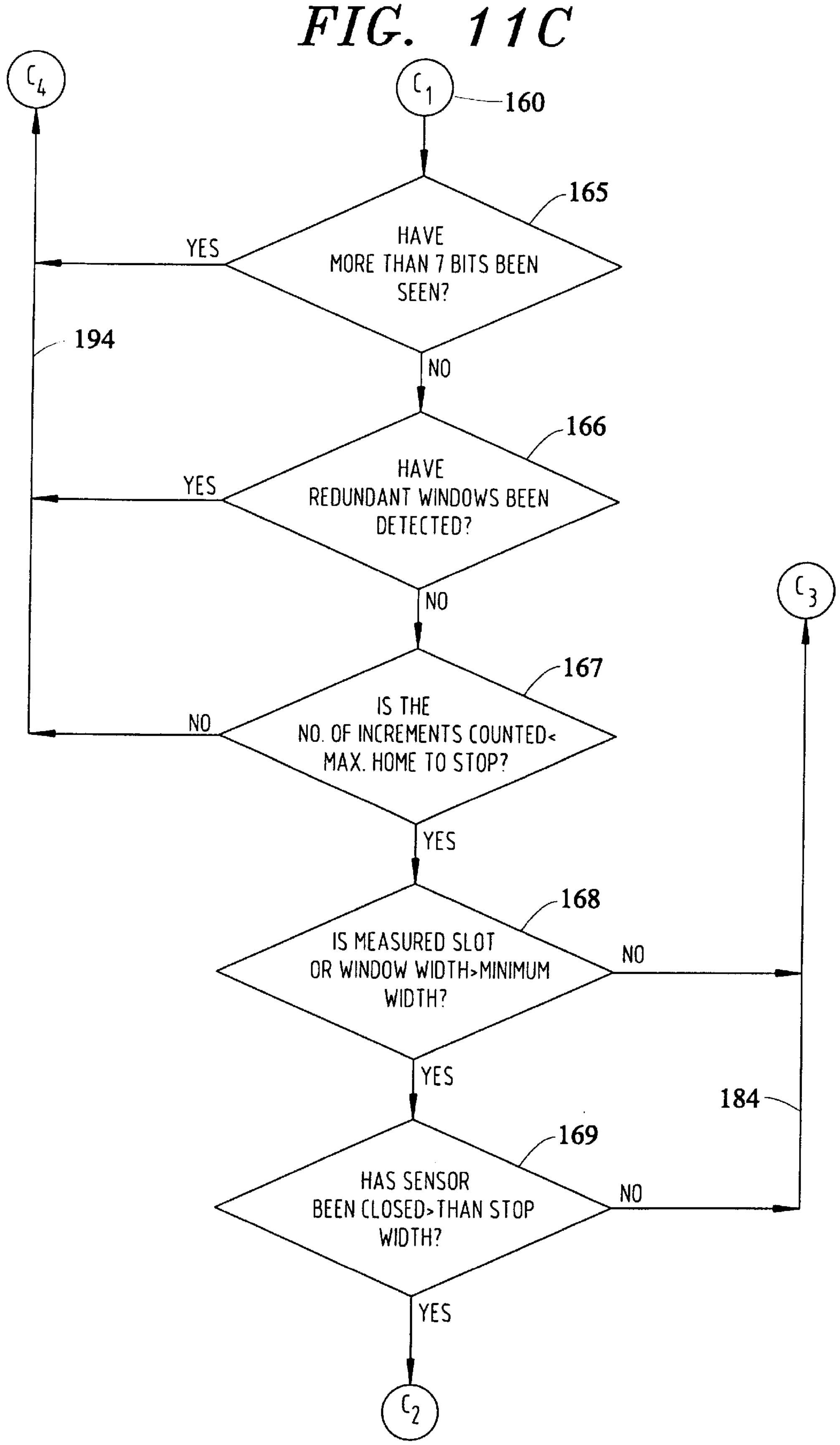
Figure 11D:
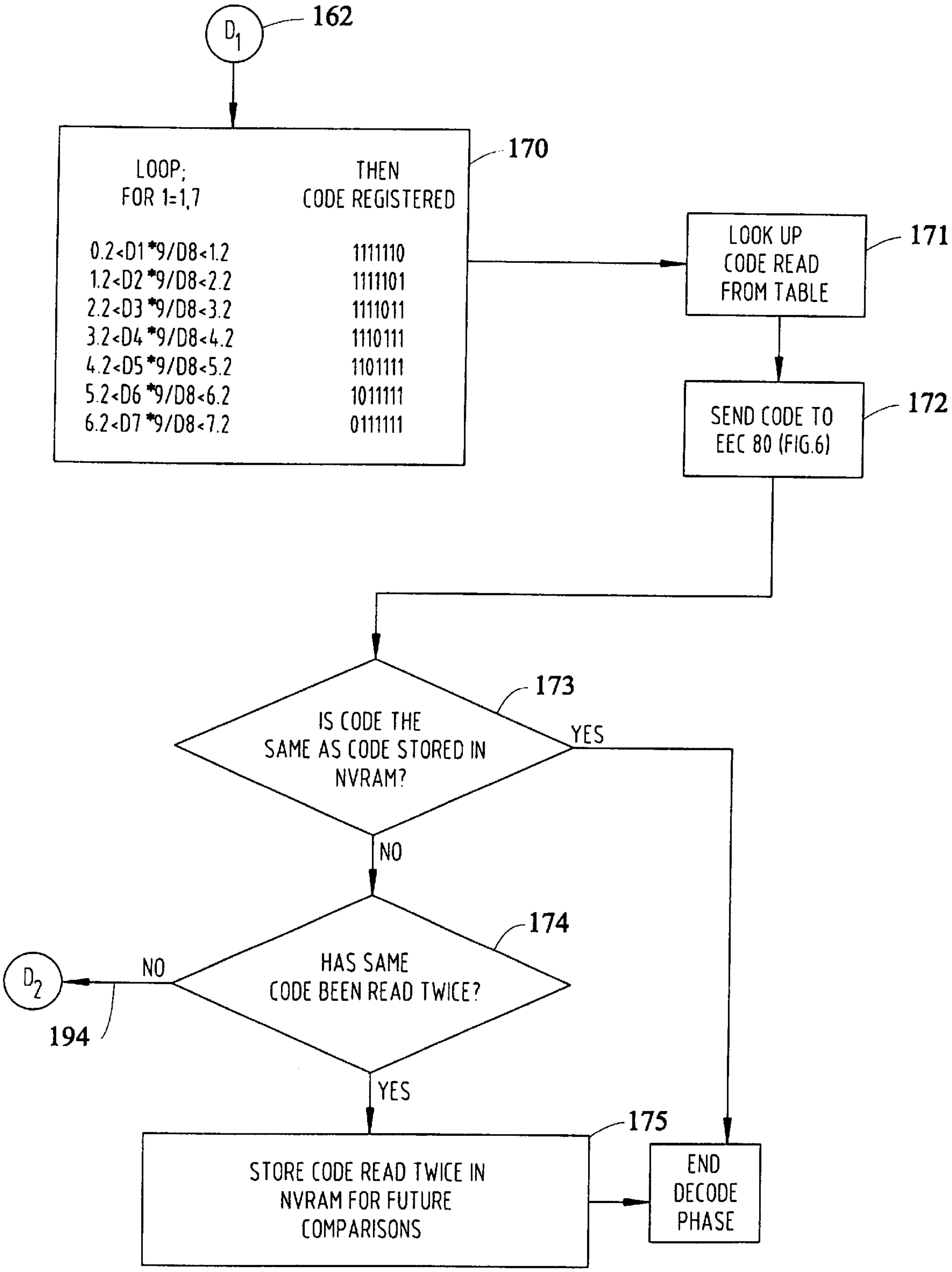
Figure 11E:
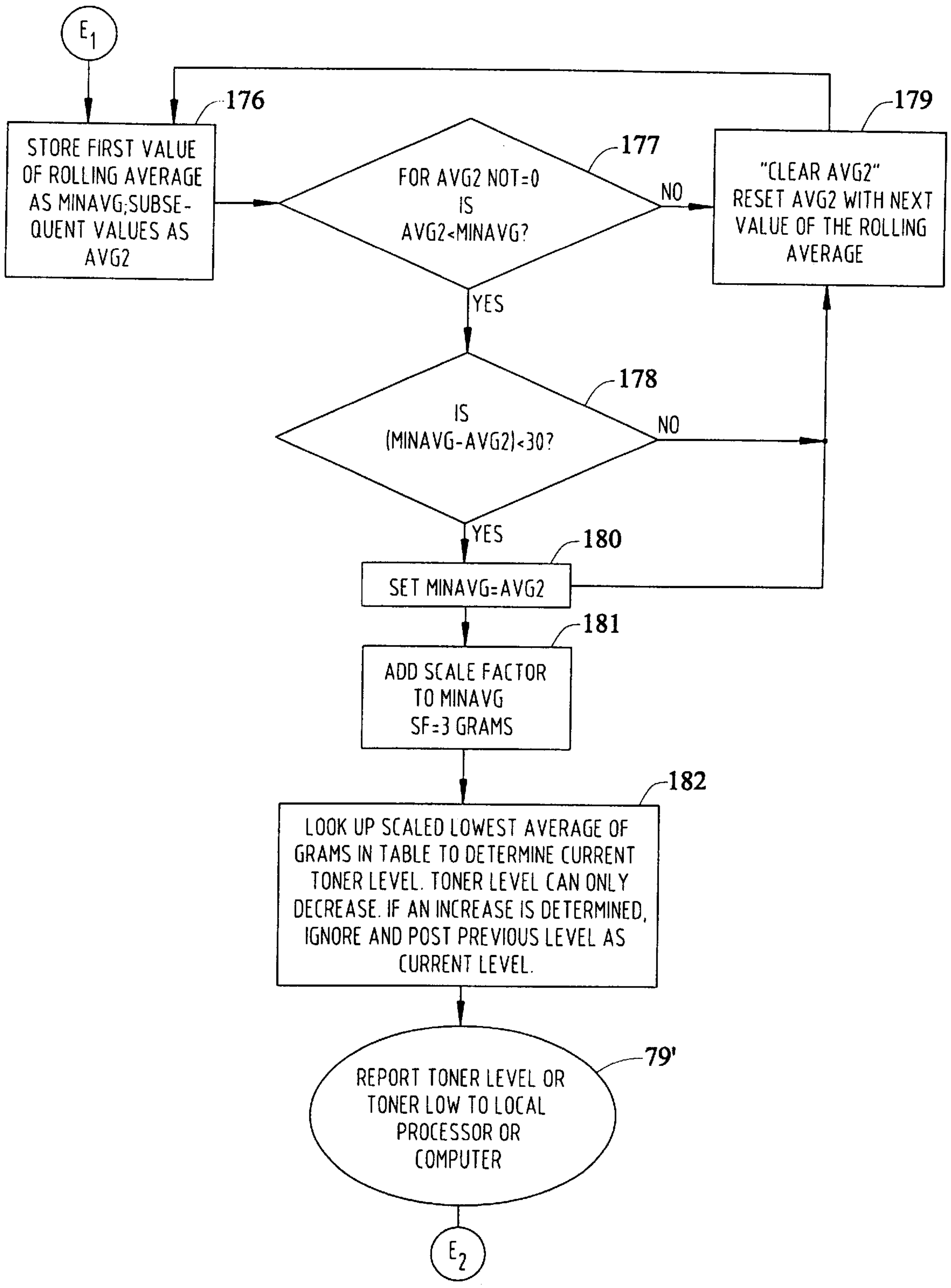
Figure 12:
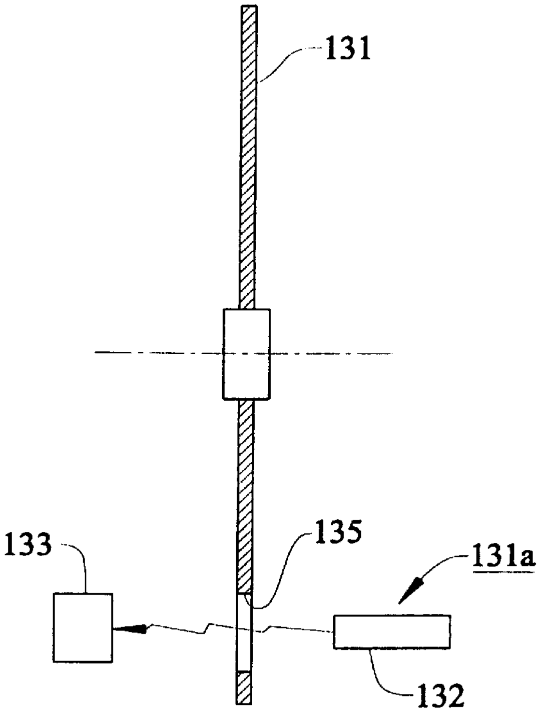
FIG. 12 is a sectional view of an encoder wheel and a schematic representation of an alternative Hall effect reader/sensor of the invention.

FIGS. 11A–11E are directed to refinements in the method of the invention depicted in FIGS. 8A and 8B. Such refinements include, for example, improvements in the code to further reduce the incidence of mistakes in location of the stop window 55 (or stop bit). As shown in FIG. 11A in comparison to FIG. 8A, additional steps 160, 161, and 162, are present, wherein further logic associated with step 161 is depicted in FIG. 11C and further logic associated with step 162 is depicted in FIG. 11D. Furthermore, shown in FIG. 11B in comparison to FIG. 8B, and continuing into FIG. 11E, is a presently more preferred manner of determining, with somewhat greater accuracy, the amount of toner remaining in the sump (toner level) regardless of the speed of rotation of the paddle 34 and associated encoded plate, or encoder wheel 31. In the following discussion, functional steps depicted in FIGS. 11A–11E which are common, or substantially similar, to those functional steps of FIGS. 8A and 8B will bear the same element numerals, and the detail of those common steps will not be repeated below.

As shown in FIGS. 8A and 8B, the steps associated with reading of the preselected cartridge characteristics and the step associated with determining the toner level in sump 33 are performed in parallel. With respect to FIGS. 11A and 11B, however, as shown at step 160, such parallel processing continues until the decoding of the preselected cartridge characteristics is successful, and thereafter, only the steps associated with determining the toner level in sump 33 (steps 66 and 67 of FIG. 11A, and the steps of FIGS. 11B and 11E) are performed. Such preselected cartridge characteristics may include, for example, initial cartridge capacity, toner type, PC drum type, qualified or unqualified as an OEM type cartridge, etc. One skilled in the art will recognize that such parallel processing may be achieved in a variety of ways, such as for example, by interleaving the program steps of the parallel paths within a single processor or by using a separate processor for each path.

Referring now to 11A, after machine 10 is started up, or after the printer cover has been opened and later closed, the variable identified as "Rolling Average" is reset at step 60. The resetting of the Rolling Average occurs prior to executing the steps associated with reading the coding representing preselected cartridge characteristic from wheel 31, i.e., steps 61, 62, 160, 63, 161, 64, 65, and 162, and prior to determining the amount of toner remaining in sump 33 of cartridge 30 beginning at step 66, and continuing into FIGS. 11B and 11E.

In order for either the preselected cartridge characteristics steps or the toner level determining steps to operate properly, the "home position" of the wheel 31 must first be found, as at step 61. The previous discussion concerning the encoder wheel 31 and the reading thereof to determine the home position of wheel 31 is equally applicable to the refinements depicted in FIGS. 11A–11E. Moreover, the pseudo code for "Reading the Wheel", discussed above is equally applicable for reading the encoder wheel, except that the portion of the code relating to the window width may be simplified, as follows:

```
If(WindowWidth > Minimum Stop window Width
        AND CumulativeCount < Maximum Stop Position) Then
        'we must ensure that the stop window is really what we found
        Finished = True
```

At step 62, the counting of increments of shaft rotation of the drive motor begins at the position associated with the trailing edge of start/home window 54. Thereafter, at step 160, a check is made as to whether the coding representing preselected cartridge characteristics was successfully decoded. If this preselected cartridge characteristics coding was not successfully decoded, then the parallel processing of the preselected cartridge characteristics and the determination of toner level continues; if so, however, such parallel processing ends, and only those steps associated with determining the toner level in cartridge 30 are performed.

During the decoding of the preselected cartridge characteristics of wheel 31, at step 63, the number of motor increments from the trailing edge of the start window 54 to each of the data bit windows 0–6 and stop window 55, respectively, are recorded. Thereafter the steps of FIG. 11C are performed.

Turning now to FIG. 11C, a check is made at step 165 to determine if more than 7 bits have been seen between the home window 54 and the stop window or bit 55. If yes, then step 61 is re-executed and the home position is once again found. This test to detect and determine the presence or absence of an excess of a finite number of slots or bits on the encoder wheel 31 is preferred because as the wheel rotates, causing the sensor to detect either a transition from open to closed state or vice-versa, bounce may occur. If the bounce duration is very small, it will be rejected as a window (slot), otherwise it may pass and be considered a valid window. In such a scenario, certain cartridges may appear to have more bit windows than physically possible. After each bit window is detected, the number of bit windows detected from the previous home detection is compared to a maximum value and if too many windows have been detected, then the code returns to the steps for finding the home state via path 194.

Another condition that can occur which makes a further check desirable is when the sensor signal transitions from one state to the other and immediately back to the original state, resulting in the indication of a detection of an additional, or redundant, window. A test for such a condition is performed at step 166. As shown in FIG. 7, and as has already been discussed, bit or slot distances on the wheel are known and mapped. The identification of what appears to be two bits or slots in the same region on wheel 31 is identified as an error in reading the preselected cartridge characteristics for that particular revolution of wheel 31, and results in a return to re-execute of step 61 of FIG. 11A via path 194.

Referring again to FIG. 11C, step 167 is performed so as assure that the code bits 0–6 are not mistaken for the stop bits. Thus, at step 167 the number of motor increments counted is compared to a predefined maximum number of such increments associated with the distance between the trailing edge of home window 54 and the trailing edge of stop window 55. If the number of motor increments is not less than the predefined maximum number, then via return loop 194, step 61 of FIG. 11A is re-entered and this loop continues until a correct reading is achieved, or until an error code indicates a fatal error to the machine operator. If the number of motor increments is equal to or greater than the predetermined maximum number, then step 168 is executed, wherein it is determined whether the measured window or slot width is greater than the minimum stop width. If not, then step 63 is re-entered via path 184. In the event that the stop window 55 width is greater than the slot window width, then a check is made at step 169 to determine whether the duration (in motor increments) of closure of the reader/sensor is a sufficient number of increments to indicate a reading of stop window 55 versus the last bit read, for example, slot 6. If slot 6 is covered, the distance or closure reading will be even longer. In the event that closure of the sensor has not occurred for a sufficient period of time, then loop 184 line is again entered and logic step 63 is once again initiated. In the event that the closure of the sensor has occurred for a sufficient period of time, then step 65 of FIG. 11A is executed.

To further insure accurate reading of the encoder wheel 31, spring 44 is preloaded to a known torque value. Preferably, this preload value is as small as possible to allow for accurate reading of low levels of toner in sump 33. The preload may be achieved by, for example, providing an adjustable tab stop in place of either or both tabs 51 and 52 of FIG. 4. Such an adjustable tab stop can be, for example, a rotatable eccentric stop.

Step 65 is directed to the actual decoding of the preselected cartridge characteristic coding of encoder wheel 31, the details of which are more fully described with respect the steps of FIG. 11D, which constitute step 162 of FIG. 11A. In the pseudo code set forth above, this starts with the REM statement "'Now translate measurements into physical bits", and the discussion concerning distances and rounding applies. In table 170 of FIG. 11D, which may be referred to as a 'loop table', logic is utilized in a loop for each reading D1–D7 of the code wheel 31 (see FIG. 7), and takes into account the rounding discussed heretofore. Note that the "code registered" is the code which would be read at each of the respective bit positions corresponding to windows or slots 0–6, wherein a "1" represents an open slot at the respective bit position. The final code is a result of ANDing each column of bits in the seven "code registered" entries. For example, if none of the slots or windows is covered, then the final code reading will be 1111111; if slot 0 (FIG. 7) is covered, then the reading will be 1111110; and, if slot 2 is also covered, then the reading will be 1111010. Of course, such binary representations may be inverted such that a "1" represents a covered slot, rather than a "0".

The code read from the loop table 170 is then interpreted by a look up table at logic step 171 and the interpreted code is then sent to the EEC 80 in a logic step 172. By a logical comparison, if the code is the same as that which is stored in NVRAM in EEC 80, as indicated in step 173, no further reading of the code is necessary and the decoding of the preselected cartridge characteristic coding of encoded plate, or wheel, 31 is ended until the next occurrence of machine start-up or machine cover cycling. To decrease decode time, after the same code has been read consecutively twice, this code is stored in the NVRAM (logic step 175) for future comparisons and the steps for decoding the coding representing the preselected cartridge characteristic information is ended. In the event that the code has not been read twice, a counter is set with a "1", and as shown in logic step 174, the path via line 194 (FIG. 11A) is entered for re-reading the code beginning at step 61 of FIG. 11A.

Once the decoding of the preselected cartridge characteristic coding is completed, the logic at step 160 then ignores further preselected cartridge characteristic code reading of wheel 31, and the method turns to solely reading the delay bits "a", "b", and "c", as discussed hereinafter relative to FIG. 11B, in determining the amount, or level, of toner in sump 33 of cartridge 30. In the presently preferred configuration of the encoder wheel 31, the trailing edge of slot "a", (angular distance D9) is 182° from D0; the trailing edge of slot "b" (angular distance D10) is 197° from D0 and the trailing edge of slot "c" (angular distance D11) is 212° from D0.

Referring again to FIG. 11A, the explanation for the logic steps 66 and 67 is the same as set forth heretofore and will not be repeated here. However, in further explanation, when reverse motion is detected a counter counts the number of back increments or steps and that same number is applied or subtracted as the motion is reversed to forward so that the count is resumed when the wheel begins its forward motion again. For example, in a single page print job, the encoder wheel will stop before a full revolution is complete. The machine will run the transport motor in reverse for a short distance after each stop in order to relieve pressure in the gear train. As set forth above, this permits, if desired, cartridge removal and/or replacement. Without correction, this could induce a considerable error in measurement of toner level. To account for this, the amount of excess motor pulses counted during the backup and restart are filtered out of the delay counts measured for toner level sensing.

Turning now to FIG. 11B, as has been explained heretofore with reference to FIG. 8B, as encoder wheel 31 rotates, paddle 34 enters toner 35 in sump 33. As set forth heretofore with reference to FIG. 8B, the angular distances of D9, D10 and D11 are known, and the number of no-load motor increments required to reach D9, D10 and D11 is known. The motor, via torsion spring 44, rotates paddle 34 and encoder wheel 31. As paddle 34 moves through toner 35, however, a paddle-to-toner resistance is incurred, which results in a torsioning of torsion spring 44, since the motor is essentially rotating at a constant rate. Thus, the actual number of motor increments required to reach each of the respective locations D9, D10, and D11 is greater during a load condition when paddle 34 engages an amount of toner than when a laser amount or no toner is engaged. This difference in the distance the motor has to travel (rotational increments) to obtain a reading at window "a", then "b" and then "c" corresponds to a level of toner in sump 33.

As described above relative to logic step 62 (FIG. 11A), the motor increments are counted. The motor increments are then recorded as S200, S215 and S230 in steps 68*a,* 68*b* and 68*c* (FIG. 11B) at the trailing edges of slots "a", "b", and "c", respectively, of the wheel 31, and subtracted from the baseline of what the numbers would be absent toner 35 in the sump 33, at steps 69*a,* 69*b,* and 69*c,* respectively. These members are directly indicative of the lag due to resistance of the toner in sump 33, with the paddle 34 in three different positions (a, b, and c) in the sump. Thus, this lag or delay is determined and shown in steps 69*a*–69*c,* respectively. As has been previously stated, there is a correlation between load torque on the lower paddle 34 and the amount of toner 35 remaining in the toner supply reservoir or sump 33. (See FIG. 9 and the discussion relating thereto.)

At steps 70 and 71, the respective baseline normalized delays are compared, and one of the three delays is selected for use in determining the toner level of cartridge 30 at the then current printer operating speed in pages per minute (ppm) at steps 72', 73' or 74'. As shown in FIG. 11B at step 70, the normalized delay @200 will be used to calculate the toner level unless its value is not greater than that of normalized delay @215. If the normalized delay @200 is less than or equal to normalized delay @215, then at step 71 it is determined whether normalized delay @215 is greater than normalized delay @230. If so, then the normalized delay @215 is used, and if not, then normalized delay @230 is used in the toner level determination. Alternatively, a maximum normalized delay figure can be used in the toner level calculation.

Preferably, the normalized delay selected in the toner level determination is sent to an equation for calculating the toner level mass (in grams of toner) at a particular machine speed in pages per minute (ppm). The equation to determine, at different ppm printing speeds, the mass in grams of toner remaining in the cartridge is the linear equation: $y=mx+b$ where:

m=slope measured in grams/pulse (or increments);

b=y axis intercept, or offset, where x=0 grams; and x=average number of pulses, or increments.

The values for variables m and b are essentially constants with respect to various printing speeds. These values may be determined empirically, or calculated or determined based upon assumptions. For example, the following table repre sents the values for variables m and b, assuming 10.80 motor pulses per degree of encoder wheel rotation.

| 8 ppm | | 12 ppm | | 18 ppm | | 24 ppm | |
|---|---|---|---|---|---|---|---|
| m | b | m | B | m | b | m | b |
| .18 | 55 | .19 | 52 | .21 | 48 | .23 | 45 |

Using the above table, for example, for an 8 ppm operating speed, the equation above becomes: y=0.18x+55. Accordingly, if x=100, then it is determined that 73 grams of toner remain in sump 33.

It has been found that with a single speed machine, i.e., one that runs at a single speed of rotation of the drum, a rolling average of the delays measured permits calculating toner level, in grams, from the outcome of that average. Under those limited circumstances, the toner level in the sump 33 may then be determined from a look up table precalculated and stored in the ROM 80*a* associated with the EEC 80 in accordance with the new rolling average. Many printers, however, are capable of multiple resolutions which may require different motor speeds, e.g., 300 dpi (dots per inch), 600 dpi, 1200 dpi, etc., which means that this manner of determining the amount of toner left in the cartridge would be accurate for only one speed. Moreover, delay is a function of both paddle velocity and toner level. In the instance where a printing job requires alternate printing at 600 and 1200 dpi, the machine runs at a different speed for each of these resolutions, and the toner level measurement is difficult to determine by the rolling average method because the rolling average contains delays measured at all of those speeds. To account for this, the rolling average is taken of a velocity independent parameter, i.e., grams. The equation given above converts the measurements of maximum delays immediately to grams, as in logic step 76'. The rolling average is then taken of grams, a speed independent parameter, and therefore velocity changes will not affect the toner level measurement. This is shown in logic step 75'.

Following step 75', the steps of FIG. 11E are performed in preparing to report a toner level or toner low indication, for example, to the EP machine and/or an attached computer. At step 176, the first value of the rolling average from logic step 75' is stored. Subsequent values are stored as AVG2 for comparison to MINAVG. In decision step 177, the value for the rolling average (AVG2) is compared to the previous value MINAVG. If AVG2 is not less than MINAVG, (which would be the normal situation), AVG2 is cleared in logic step 179, and AVG2 is reset with the next value of the rolling average. If the comparison is affirmative, then a further test is performed at step 178 to determine whether the difference between the two readings is logical. If the difference is less than 30 (grams), then the reading is considered logical. If, on the other hand, the difference is greater than or equal to 30, then the reading is discarded as being noise and once again logic block 179 is entered for clearing AVG2 and resetting it with the next value of the rolling average. If the comparison value is less than 30 at step 178, then MINAVG is set equal to AVG2 at step 180 and sent to steps 179 and 181 in parallel. Depending upon the machine, it has been discovered that it may be desirable to add a scale factor to MINAVG, such as for example, a scale factor (SF) of 3 grams, as is shown at step 181.

The amount of toner held in the sump 33 of a cartridge 30 can vary. Standard toner quantity, measured in grams for a full cartridge, is approximately 400 grams. A user would prefer to know how much is left for use in the machine, e.g., is the sump 33 is half full, ¾ full, or ⅛ full, and this is achieved at step 182. The result of step 181, i.e., MINAVG+3 grams, is looked up in the ROM 80*a* of the EEC card 80 (see FIG. 6). Moreover, as shown in logic step 182, if the toner level increases (as it occasionally does due to noise and unless the cartridge has been replaced since the last measurement), this reading is ignored and the previous toner level is posted as the current level. At step 79', the ROM output returns a sump level to the local machine processor for a direct reading on a printer display, or it sends the reading to the host computer.

Thereafter, the process returns to step 77' of FIG. 11B, in which the oldest delay value from the five held in generating the rolling average is removed. At step 78', the process then delays X steps, or increments, after the first toner level slot before searching for the "home position", i.e., before returning to step 61 of FIG. 11A. The number of steps, X, is chosen to ensure that the third toner level slot has passed the sensor. Thereafter, steps 62, 160, 66, of FIG. 11A are completed, and the steps of FIGS. 11B, and 11E for determining the toner level in sump 33 of cartridge 30 are repeated.

One skilled in the art will recognize that an encoded plate, such as encoder wheel 31, may be fabricated, for example, by forming slots, or openings, in a material. Such a material is preferably disk-shaped, and may, for example, be made of plastic or metal. Although the disk-shaped design is preferred, other shapes may be used without departing from the spirit of the invention.

Also, one skilled in the art will recognize that the windows, or slots, may be free of any material, or alternatively, filled with a transparent material. In addition, it is contemplated that the encoder 31 could be fabricated, for example, from a transparent material having a coating deposited thereon which defines the coding, such as for example, by defining the edges of each window, and in which the coating does not effectively transfer light impinging on its surface.

FIGS. 12–16 show further illustrative embodiments of an encoded wheel corresponding generally to encoder wheel 31 depicted in FIGS. 1–3, and 7. For example, and referring first to FIG. 12, the encoder wheel 31 may be replaced by an identically slotted wheel 131 composed of a ferromagnetic material. The reader/sensor 131*a,* in this instance, may include an alternate energy source such as a magnet 132 and the receptor or receiver may comprise a magnetic field sensor, such as a Hall effect device, 133 in place of the optical encoder wheel reader/sensor 31*a*. In operation, the ferromagnetic material of the encoder wheel 131 blocks the magnetic flux emanating from the permanent magnet 132 except where there are slots 135 in the wheel 131. Either the Hall effect device 133 or the magnet 132 may be attached to one of or both the printer 10 or cartridge 30.

Figure 13:
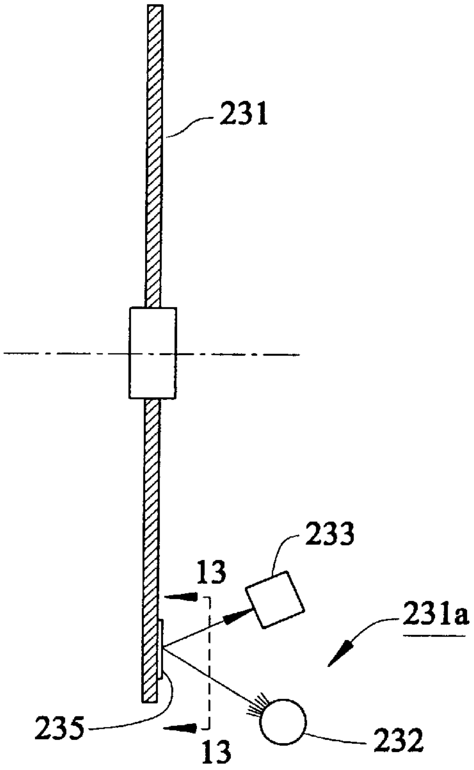
FIG. 13 is a sectional view of an encoder wheel and a schematic representation of an alternative reflective reader/sensor of the invention.
Figure 14:
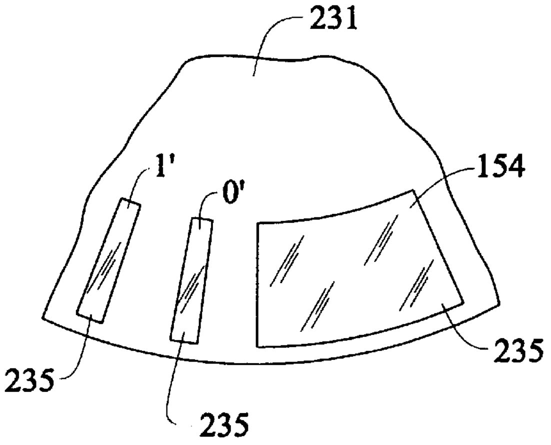
FIG. 14 is a fragmentary side elevational view of a portion of the encoder wheel of FIG. 12 and taken along line 13—13 of FIG. 12.

In another example, and referring now to FIGS. 13 and 14, an encoder wheel 231 may be employed in association with another reader/sensor 231*a*. In this embodiment, in lieu of slots or windows in the wheel, such as in encoder wheels 31 and 131, such slots or windows are replaced with reflective material 235. In this scheme, the encoder wheel reader/sensor 231*a* includes a light source 232 and light sensor or receiver 233 which is activated as the encoder wheel rotates and the light from the light source is reflected from the reflective material 235. In comparing the windows or slots of the encoder wheel 31 and the reflective material 235 of wheel 231, it should be noted that the Start/Home window 54 in FIG. 7 corresponds to the Start/Home window (reflective material) 154 in FIGS. 13 and 14, while the information slots 0 and 1 of the encoder wheel 31 in FIG. 7, correspond to the reflective material 235 at 0' and 1' of FIG. 14. Preferably, the wheel 231 should be made of a non-reflective material to avoid scattered or erroneous readings by the optical reader 233. An advantage of this type of structure is that the reader/sensor 231*a* need be only on one side of the encoder wheel, simplifying machine and toner cartridge design.

Figure 15:
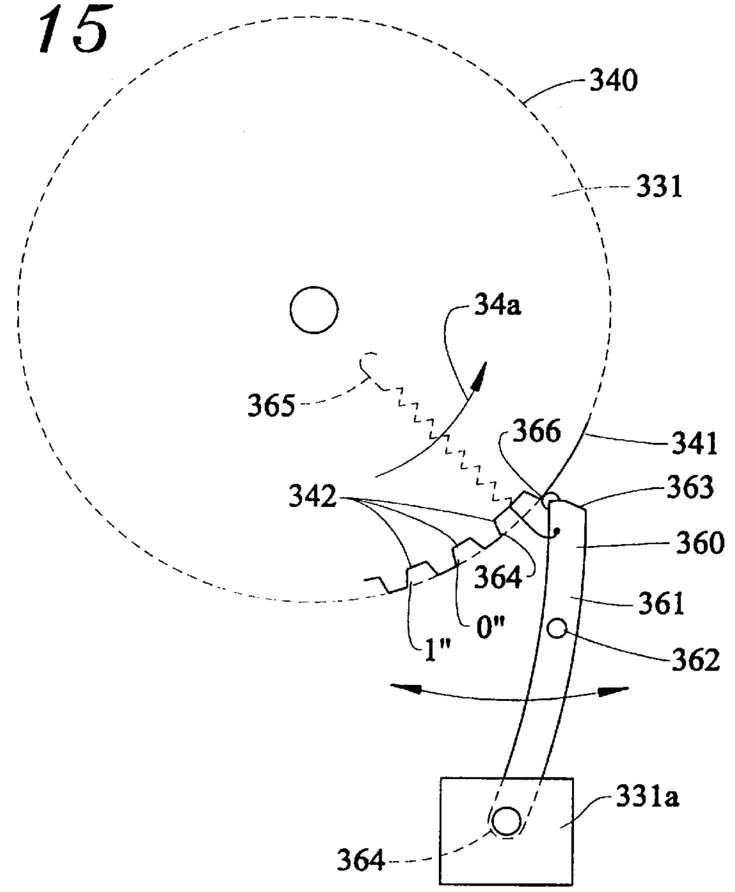
FIG. 15 is a fragmentary side elevational view of an encoder wheel with a cam surface implementation and a cam follower reader/sensor mechanism.
Figure 16:
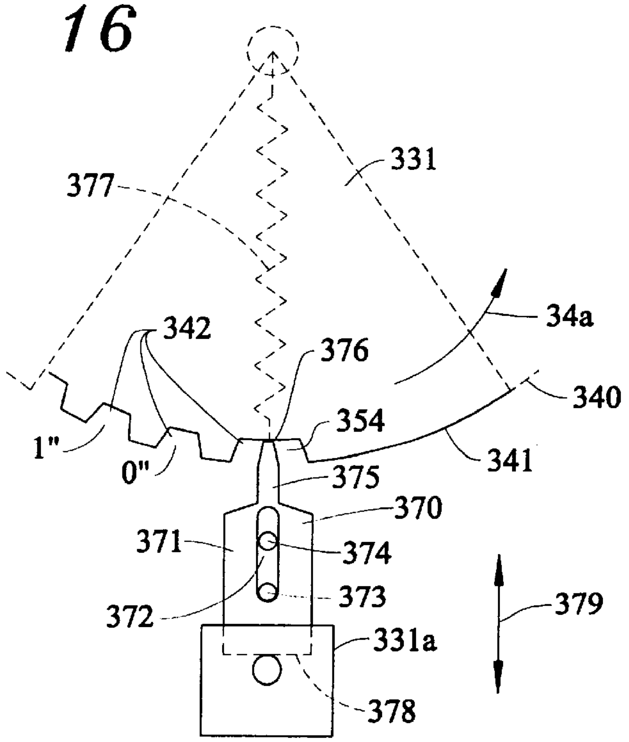
FIG. 16 is a fragmentary side elevational view of an encoder wheel with a cam surface implementation and an alternative cam follower reader/sensor mechanism.

The design of an encoder wheel 331 in FIGS. 15 and 16 may be similar, employing a cam follower actuated reader/sensor 331*a*. In these embodiments, the encoder wheel 331 includes a circumferentially extending cam surface 340 on the periphery of the encoder wheel, wherein the periphery acts as cam lobes 341 with appropriate cam recesses or depressions 342. In comparing the windows or slots of the encoder wheel 31 and the cam recesses or depressions 342, it should be noted that the Start/Home window 54 in FIG. 7 corresponds to the Start/Home recess 354 in FIGS. 15 and 16, while the information slots 0 and 1 of the encoder wheel 31 in FIG. 7, correspond to the cam recesses 342 at 0" and 1" of FIGS. 15 and 16.

The cam followers 360 and 370 of FIGS. 15 and 16, respectively, may take multiple forms, each cooperating with a reader/sensor 331*a*. The reader/sensor may take many forms, for example a micro-switch which signals, upon actuation, a change of state; or it may be similar to the reader/sensor 31*a* or 131*a*, except that the cam followers act to interrupt the energy source and receptor or receiver associated with their own reader/sensor 331*a*.

In the embodiment of FIG. 15, the cam follower 360 is formed as a bar or arm 361 pivoted on a shaft 362, which in turn is attached, for example, to an appropriate portion of the cartridge 30. Thus, arm 361 acts in pressing engagement with the cam surface 341 due to the action of biasing spring 365. As shown, the biasing extension spring 365 is connected to one end 363 of the bar or arm 361 and anchored at its other end, preferably, to cartridge 30. The cam engaging terminal end of the arm or bar may include a roller 366 to reduce sliding friction. The opposite or energy interrupter end 364 of the bar or arm 361 is appropriately located for reciprocation about the pivot 362.

In the embodiment of FIG. 16, the cam follower 370 takes the form of a reciprocating bar 371 having a centrally located, cam follower throw limiter slot 372, with locating and guide pins 373 and 374 therein for permitting reciprocation (as per the arrow 379) of the bar 371. As shown, one terminal end 375 of the bar 371, may include a roller 376 for pressing engagement against the cam surface 341. To ensure proper following of the follower 370, a biasing extension spring 377 biases the roller 376 of the bar 371 against the rotating cam surface. As in the embodiment of FIG. 15, the follower bar 371 includes an energy interrupter portion 378 for reciprocation into and out of the path between the energy source and receptor of the reader/sensor 331*a*.

Thus, the present invention provides a simple yet effective method and apparatus for transmitting to a host computer or machine of a type employing toner, information concerning the characteristics of an EP cartridge. Such information can include continuing data relating to the amount of toner left in the cartridge during machine operation and/or preselected cartridge characteristic information. Still further, the present invention provides a simplified, but effective, method and means for changing the initial information concerning the cartridge, which means and method is accurate enough and simple enough to allow for either in field alterations or end of manufacturing coding of the EP cartridge.

Although the invention has been described with respect to preferred embodiments, those skilled in the art will recognize that changes may be made in form and in detail without departing from the spirit and scope of the following claims.

What is claimed is:

1. An encoded wheel for a toner cartridge comprising a plate having preprogrammed indicia positioned at locations defined in relation to a clock face, said preprogrammed indicia including a start indicia positioned between about a 5:00 o'clock position and a 6:00 o'clock position, a stop indicia positioned at about a 9:00 o'clock position, at least one preselected cartridge characteristic indicia positioned between said start indicia and said stop indicia, and at least one measurement indicia located between about 200 degrees and about 230 degrees from said 6:00 o'clock position.

2. The encoded wheel of claim 1, wherein each said indicia comprises a slot.

3. An encoded wheel for a toner cartridge comprising a plate having preprogrammed indicia positioned at locations defined in relation to a clock face, said preprogrammed indicia including a first slot positioned between about a 5:00 o'clock position and a 6:00 o'clock position, a second slot positioned at about a 9:00 o'clock position, a third slot positioned between said first slot and said second slot, and each of a fourth slot, a fifth slot and a sixth slot sequentially located in a clockwise direction between about 200 degrees and about 230 degrees from said 6:00 o'clock position, and wherein no further slot is located between said second slot and said fourth slot and no further slot is located between said sixth slot and said first slot.

4. A toner cartridge comprising a rotatable wheel having preprogrammed indicia positioned at locations defined in relation to a clock face, said preprogrammed indicia including a first slot positioned between about a 5:00 o'clock position and a 6:00 o'clock position, a second slot positioned at about a 9:00 o'clock position, a third slot positioned between said first slot and said second slot, and each of a fourth slot, a fifth slot and a sixth slot sequentially located in a clockwise direction between about 200 degrees and about 230 degrees from said 6:00 o'clock position, and wherein no further slot is located between said second slot and said fourth slot and no further slot is located between said sixth slot and said first slot.

5. The toner cartridge of claim 4, wherein said third slot is one of a plurality of slots located between said first slot and said second slot.

6. An encoded device for a toner cartridge comprising a plate having preprogrammed indicia positioned at locations defined in relation to a clock face, said preprogrammed indicia including a start indicia positioned between about a 5:00 o'clock position and a 6:00 o'clock position, a stop indicia positioned at about a 9:00 o'clock position, at least one preselected cartridge characteristic indicia positioned between said start indicia and said stop indicia, and at least one measurement indicia located between about 200 degrees and about 230 degrees from said 6:00 o'clock position.

7. The encoded device of claim 6, wherein each said indicia comprises a slot.

8. The encoded device of claim 6, wherein said at least one preselected cartridge characteristic indicia comprises a plurality of cartridge characteristic indicia positioned between said start indicia and said stop indicia.

9. The encoded device of claim 6, wherein said at least one measurement indicia comprises a plurality of measurement indicia located between about 200 degrees and about 230 degrees in a clockwise direction from said 6:00 o'clock position.

10. The encoded device of claim 9, wherein said plurality of measurement indicia comprises a first slot having a first trailing edge, a second slot having a second trailing edge and a third slot having a third trailing edge, wherein said first trailing edge is located at about 200 degrees in a clockwise direction from said 6:00 o'clock position, said second trailing edge is located at about 215 degrees in a clockwise direction from said 6:00 o'clock position and said third trailing edge is located at about 230 degrees in a clockwise direction from said 6:00 o'clock position.

11. The encoded device of claim 10, wherein no further indicia is located between aid stop indicia and said first slot in said clockwise direction.

12. The encoded device of claim 10, wherein no further indicia is located between said third slot and said start indicia in said clockwise direction.

13. The encoded device of claim 6, wherein said plate comprises a circular disk.

14. The encoded device of claim 6, wherein said toner cartridge includes a sump for carrying a supply of toner and an agitator rotatably mounted in said sump, said agitator having a first end and a second end, said plate being coupled to said first end of said agitator.

15. An encoded device for a toner cartridge comprising a plate having preprogrammed indicia positioned at locations defined in relation to a clock face, said preprogrammed indicia including a first slot positioned between about a 5:00 o'clock position and a 6:00 o'clock position, a second slot positioned at about a 9:00 o'clock position, a third slot positioned between said first slot and said second slot, and each of a fourth slot, a fifth slot and a sixth slot sequentially located in a clockwise direction between about 200 degrees of about 230 degrees from said 6:00 o'clock position.

16. The encoded device of claim 15, wherein no further slot is located between said second slot and said fourth slot and no further slot is located between said sixth slot and said first slot.

17. The encoded device of claim 15, wherein said toner cartridge includes a sump for carrying a supply of toner and an agitator rotatably mounted in said sump, said agitator having a first rotating end and a second rotating end, said plate being adapted for coupling to said first rotating end of said agitator.

18. An encoded device comprising a rotatable wheel having indicia positioned at locations defined in relation to a clock face, said indicia including a first slot positioned between about a 5:00 o'clock position and a 6:00 o'clock position, a second slot positioned at about a 9:00 o'clock position, a third slot positioned between said first slot and said second slot, and each of a fourth slot, a fifth slot and a sixth slot sequentially located in a clockwise direction between about 200 degrees and about 230 degrees from said 6:00 o'clock position.

19. The encoded device of claim 18, wherein no further slot is located between said second slot and said fourth slot and no further slot is located between said sixth slot and said first slot.

20. An encoded device of claim 18, wherein said third slot is one of a plurality of slots located between said first slot and said second slot.

21. The encoded wheel of claim 18 wherein, said rotatable wheel is adapted for coupling to a first end of an agitator, said agitator being rotatably mounted in a sump for carrying a supply of toner.

22. An encoded device comprising a disk having a plurality of indicia located near a circumferential perimeter of said disk, said plurality of indicia including a first preselected cartridge characteristic indicia having a first extent, a second indicia having a second extent larger than said first extent, and a third indicia having a third extent larger than said second extent.

23. The encoded device of claim 22, wherein said indicia is positioned in relation to a clock face between about a 5:00 o'clock position and a 6:00 o'clock position and said second indicia is positioned at about a 9:00 o'clock position, and said first preselected cartridge characteristic being position between said 6:00 o'clock position and said 9:00 o'clock position.

24. The encoded device of claim 22, wherein said plurality of indicia further includes at least one measurement indicia located between about 200 degrees and about 230 degrees in a clockwise direction from a 6:00 o'clock position.

25. The encoded device of claim 24, wherein said at least one measurement indicia comprises a first slot having a first trailing edge, a second slot having a second trailing edge and a third slot having a third trailing edge, wherein said first trailing edge is located at about 200 degrees in a clockwise direction from said 6:00 o'clock position, and second trailing edge is located at about 215 degrees in a clockwise direction from said 6:00 o'clock position and said third trailing edge is located at about 230 degrees in a clockwise direction from said 6:00 o'clock position.

* * * * *